(12) United States Patent
Hutchison et al.

(10) Patent No.: US 10,740,228 B2
(45) Date of Patent: *Aug. 11, 2020

(54) LOCALITY GROUPING DURING GARBAGE COLLECTION OF A STORAGE DEVICE

(71) Applicant: Sandisk Technologies LLC, Addison, TX (US)

(72) Inventors: Neil D. Hutchison, Hudsonville, MI (US); Steven Theodore Sprouse, San Jose, CA (US); Shakeel I. Bukhari, San Jose, CA (US)

(73) Assignee: Sandisk Technologies LLC, Addison, TX (US)

(*) Notice: Subject to any disclaimer, the term of this patent is extended or adjusted under 35 U.S.C. 154(b) by 142 days.

This patent is subject to a terminal disclaimer.

(21) Appl. No.: 15/983,026

(22) Filed: May 17, 2018

(65) Prior Publication Data

US 2018/0336127 A1 Nov. 22, 2018

Related U.S. Application Data

(60) Provisional application No. 62/508,326, filed on May 18, 2017.

(51) Int. Cl.
*G06F 12/02* (2006.01)

(52) U.S. Cl.
CPC ...... *G06F 12/0253* (2013.01); *G06F 12/0246* (2013.01); *G06F 2212/1044* (2013.01); *G06F 2212/7203* (2013.01); *G06F 2212/7205* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 5,197,128 A | * | 3/1993 | Campbell | G06F 5/065 710/56 |
| 5,764,880 A | * | 6/1998 | Gerdt | G06F 11/1076 714/6.32 |
| 6,021,509 A | * | 2/2000 | Gerdt | G06F 11/1076 714/6.32 |
| 7,444,461 B2 | * | 10/2008 | Traister | G06F 12/0246 711/103 |

(Continued)

*Primary Examiner* — Christopher D Birkhimer
(74) *Attorney, Agent, or Firm* — Morgan, Lewis & Bockius LLP

(57) ABSTRACT

Systems, methods and/or devices are used to enable locality grouping during garbage collection of a storage device. In one aspect, the method includes, at a storage controller for the storage device: performing one or more operations for a garbage collection read, including: identifying one or more sequences of valid data in a source unit, wherein each identified sequence of valid data has a length selected from a set of predefined lengths; and for each respective sequence of the one or more sequences of valid data in the source unit, transferring the respective sequence to a respective queue of a plurality of queues, in accordance with the length of the respective sequence; and performing one or more operations for a garbage collection write, including: identifying full respective queues for writing to a destination unit; and writing from the full respective queues to the destination unit.

20 Claims, 20 Drawing Sheets

(56) References Cited

U.S. PATENT DOCUMENTS

| | | | | |
|---|---|---|---|---|
| 7,451,265 B2* | 11/2008 | Traister | ............... | G06F 12/0246 |
| | | | | 711/103 |
| 8,429,318 B1* | 4/2013 | Karamcheti | ........ | G06F 13/1657 |
| | | | | 710/62 |
| 8,516,172 B1* | 8/2013 | Karamcheti | ........ | G06F 12/0246 |
| | | | | 710/62 |
| 8,677,037 B1* | 3/2014 | Karamcheti | ........ | G06F 13/1657 |
| | | | | 710/62 |
| 8,850,091 B1* | 9/2014 | Karamcheti | ........ | G06F 12/0246 |
| | | | | 710/62 |
| 9,400,603 B2* | 7/2016 | Tressler | ................ | G06F 3/0604 |
| 9,411,519 B2* | 8/2016 | Tressler | ................ | G06F 3/0604 |
| 9,436,595 B1* | 9/2016 | Benitez | ............... | G06F 12/0246 |
| 9,582,417 B2* | 2/2017 | Narasimha | ......... | G06F 12/0246 |
| 9,621,653 B2* | 4/2017 | Chen | ..................... | G06F 3/0604 |
| 9,652,156 B2* | 5/2017 | Alcantara | ........... | G06F 12/0246 |
| 2008/0034174 A1* | 2/2008 | Traister | ............... | G06F 12/0246 |
| | | | | 711/159 |
| 2008/0034175 A1* | 2/2008 | Traister | ............... | G06F 12/0246 |
| | | | | 711/159 |
| 2008/0082596 A1* | 4/2008 | Gorobets | ............ | G06F 12/0253 |
| 2008/0240111 A1* | 10/2008 | Gadelrab | ............... | H04L 49/90 |
| | | | | 370/395.7 |
| 2014/0304456 A1* | 10/2014 | Narasimha | ......... | G06F 12/0246 |
| | | | | 711/103 |
| 2014/0304560 A1* | 10/2014 | Narasimha | .......... | G06F 11/0727 |
| | | | | 714/704 |
| 2015/0169237 A1* | 6/2015 | Ioannou | ................ | G06F 3/0679 |
| | | | | 711/103 |
| 2016/0170646 A1* | 6/2016 | Tressler | ................ | G06F 3/0604 |
| | | | | 711/103 |
| 2016/0170656 A1* | 6/2016 | Tressler | ................ | G06F 3/0604 |
| | | | | 711/103 |

* cited by examiner

US 10,740,228 B2

LOCALITY GROUPING DURING GARBAGE COLLECTION OF A STORAGE DEVICE

RELATED APPLICATIONS

This application claims priority to U.S. Provisional Patent Application No. 62/508,326, filed May 18, 2017, which is hereby incorporated by reference in its entirety. This application is also related to U.S. Provisional Patent Application No. 62/508,236, filed May 18, 2017, which is hereby incorporated by reference in its entirety.

TECHNICAL FIELD

The disclosed embodiments relate generally to memory systems, and in particular, to locality grouping during garbage collection of a storage device (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Garbage collection is a process of memory management that reclaims portions of memory that no longer contain valid data. Using flash memory as an example, data is written to flash memory in units called pages, which are made up of multiple memory cells. However, flash memory is erased in larger units called blocks, which are made up of multiple pages. If some pages of a first block contain invalid data, those pages cannot be overwritten until the whole block containing those pages is erased. The process of garbage collection reads and re-writes the pages with valid data from the first block into a second block and then erases the first block. After garbage collection, the second block contains pages with valid data and free pages that are available for new data to be written. However, blindly gathering valid data in a source block (e.g., the first block) and re-writing the valid data to a destination block (e.g., the second block) can degrade the performance of host read operations after garbage collection.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable locality grouping during garbage collection of a storage device. In one aspect, one or more operations for a garbage collection read is performed, including identifying one or more sequences of valid data in a source unit, wherein each identified sequence of valid data has a length selected from a set of predefined lengths, and for each respective sequence of the one or more sequences of valid data in the source unit, transferring the respective sequence to a respective queue, in accordance with the length of the respective sequence; and one or more operations for a garbage collection write is performed, including identifying respective queues for writing to a destination unit, and writing from the respective queues to the destination unit.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
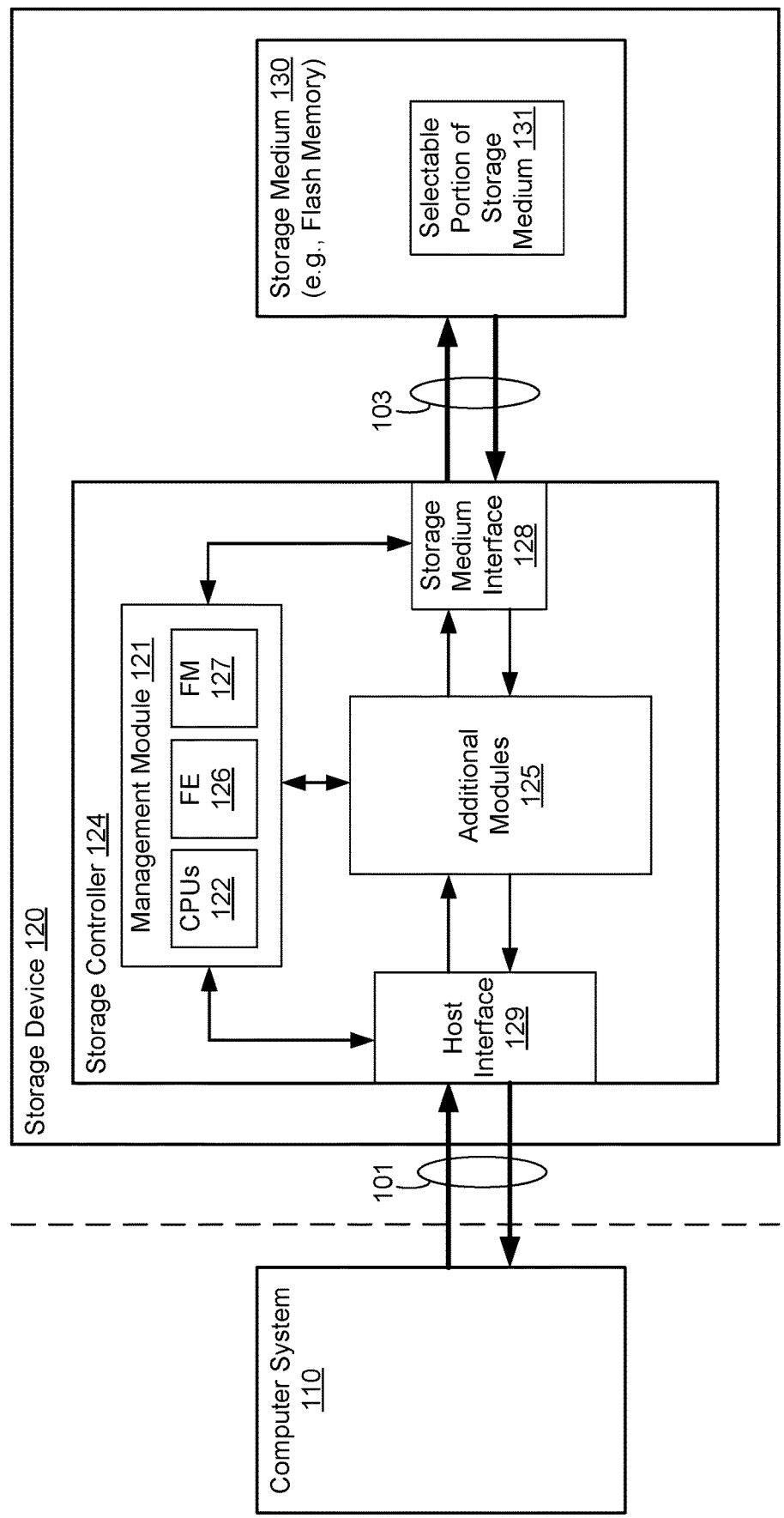
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods and/or devices used to enable locality grouping during garbage collection of a storage device. Some embodiments include systems, methods and/or devices to perform one or more operations for a garbage collection read, including identifying sequences of valid data in a source unit, wherein each identified sequence of valid data has a length selected from a set of predefined lengths, and for each respective sequence of the sequences of valid data in the source unit, transferring the respective sequence to a respective queue, in accordance with the length of the respective sequence; and perform one or more operations for a garbage collection write, including identifying full respective queues for writing to a destination unit, and writing from the full respective queues to the destination unit.

(A1) More specifically, some embodiments include a method for operating a storage device that includes non-volatile memory. In some embodiments, the method includes, at a storage controller for the storage device: receiving a plurality of garbage collection requests, wherein each garbage collection request specifies a source unit; in response to receiving a garbage collection request of the plurality of garbage collection requests, performing one or more operations for a garbage collection read, including: identifying one or more sequences of valid data in the source unit, wherein each identified sequence of valid data has a length selected from a set of predefined lengths, the set including a first length, a second length, and a third length; and for each respective sequence of the one or more sequences of valid data in the source unit, transferring the respective sequence to a respective queue of a plurality of queues, in accordance with the length of the respective sequence; and after performing the one or more operations for the garbage collection read, performing one or more operations for a garbage collection write, including: identifying full respective queues for writing to a destination unit; and writing from the full respective queues to the destination unit.

(A2) In some embodiments of the method of A1, the plurality of queues comprises buffer memory distinct from non-volatile memory in the destination unit.

(A3) In some embodiments of the method of any of A1 to A2, the storage controller for the storage device includes a first module and a second module; receiving the plurality of garbage collection requests includes receiving, at the second module, a plurality of garbage collection read requests from the first module; and the one or more operations for the garbage collection read are performed in response to receiving a respective garbage collection read request of the plurality of garbage collection read requests.

(A4) In some embodiments of the method of A3, the method further includes: prior to performing one or more operations for the garbage collection write, receiving, at the second module, a garbage collection write request from the first module; and performing the one or more operations for the garbage collection write in response to receiving the garbage collection write request.

(A5) In some embodiments of the method of any of A1 to A4, wherein each sequence of the one or more sequences of valid data in the source unit includes one or more logical pages of valid data.

(A6) In some embodiments of the method of any of A1 to A5, identifying the one or more sequences of valid data in the source unit includes: for each respective sequence of valid data, determining whether the respective sequence has the first length, the second length, or the third length by: determining whether the respective sequence has the third length; in accordance with a determination that the respective sequence does not have the third length, determining whether the respective sequence has the second length; and in accordance with a determination that the respective sequence does not have the second length, determining whether the respective sequence has the first length.

(A7) In some embodiments of the method of any of A1 to A6, transferring the respective sequence to the respective queue of the plurality of queues, in accordance with the length of the respective sequence, includes: in accordance with a determination that the respective sequence of valid data has the first length, transferring the respective sequence of valid data into a first queue of a first type; in accordance with a determination that the respective sequence of valid data has the second length, transferring the respective sequence of valid data into a second queue of a second type; and in accordance with a determination that the respective sequence of valid data has the third length, transferring the respective sequence of valid data into a third queue of a third type.

(A8) In some embodiments of the method of A7, the first queue, the second queue, and the third queue are the same size.

(A9) In some embodiments of the method of any of A7 to A8, in the plurality of queues, queues of the first type of queue each hold single logical pages.

(A10) In some embodiments of the method of any of A7 to A9, in the plurality of queues, queues of the second type of queue each hold at least one sequence of logical pages of at least the second length.

(A11) In some embodiments of the method of any of A7 to A10, in the plurality of queues, queues of the third type of queue each hold at least one sequence of logical pages of at least the third length.

(A12) In some embodiments of the method of any of A7 to A11, the method further includes: in accordance with a determination that the first queue of the first type is full, allocating a fourth queue of the first type; in accordance with a determination that the second queue of the second type is full, allocating a fifth queue of the second type; and in accordance with a determination that the third queue of the third type is full, allocating a sixth queue of the third type.

(A13) In some embodiments of the method of any of A1 to A12, writing from the full respective queues to the destination unit includes writing from the full respective queues in sequence, from an oldest full respective queue to a newest full respective queue, to the destination unit.

(A14) In some embodiments of the method of any of A1 to A13, writing from the full respective queues to the destination unit includes writing from the full respective queues to the destination unit until the destination unit is full.

(A15) In some embodiments of the method of any of A1 to A14, the method further includes: prior to performing the one or more operations for the garbage collection write: in accordance with logical address information, rearranging one or more sequences of valid data in the plurality of queues to group logically sequential data together, wherein at least one queue in the plurality of queues has a longer sequence of logically sequential data after the rearranging than before the rearranging.

(A16) In some embodiments of the method of any of A1 to A15, identifying full respective queues and writing from the full respective queues includes: identifying full respective queues for writing to one or more destination units in one or more memory channels, respectively; and in accordance with a determination that at least N of the full respective queues are logically sequential, where N is a predefined integer greater than one, writing the N full respective queues that are logically sequential to destination units in at least two different memory channels.

(A17) In some embodiments of the method of A16, writing the N full respective queues that are logically sequential to destination units in at least two different memory channels includes: writing from a first queue of the N full respective queues that are logically sequential to a first destination unit of a first memory channel; and writing from a second queue of the N full respective queues that are logically sequential to a second destination unit of a second memory channel.

(A18) In some embodiments of the method of any of A1 to A17, the storage device comprises one or more flash memory devices.

(A19) In another aspect, a storage device includes (1) non-volatile memory (e.g., comprising one or more non-volatile storage devices, such as flash memory devices), (2) one or more processors, and (3) controller memory (e.g., non-volatile memory or volatile memory in or coupled to the controller) storing one or more programs, which when executed by the one or more processors cause the storage device to perform or control performance of any of the methods A1 to A18 described herein.

(A21) In yet another aspect, any of the methods A1 to A18 described above are performed by a storage device including means for performing any of the methods described herein.

(A23) In yet another aspect, a storage system includes (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods A1 to A18 described herein.

(A24) In yet another aspect, some embodiments include a non-transitory computer readable storage medium, storing one or more programs configured for execution by one or more processors of a storage device, the one or more programs including instructions for performing any of the methods A1 to A18 described herein.

The various embodiments described herein include systems, methods and/or devices used to enable locality grouping during garbage collection of a storage device. Some embodiments include systems, methods and/or devices to perform one or more operations for a garbage collection read, including: identifying sequences of valid data in a source unit, wherein each identified sequence of valid data has a length selected from a set of predefined lengths; for each respective sequence of the sequences of valid data in the source unit, transferring the respective sequence to a respective queue, in accordance with the length of the respective sequence; and setting a global flag to flush all open queues; and perform one or more operations for a garbage collection write, including identifying open respective queues for writing to a destination unit, and writing from the open respective queues to the destination unit.

(B1) More specifically, some embodiments include a method for operating a storage device that includes non-volatile memory. In some embodiments, the method includes, at a storage controller for the storage device, the storage controller including a first module and a second module: receiving, at the second module, a garbage collection read request from the first module, wherein the garbage collection read request specifies a source unit and a tag to indicate the source unit contains last valid pages in a block; in response to receiving the garbage collection read request, performing one or more operations for a garbage collection read, including: identifying one or more sequences of valid data in the source unit, wherein each identified sequence of valid data has a length selected from a set of predefined lengths, the set including a first length, a second length, and a third length; for each respective sequence of the one or more sequences of valid data in the source unit, transferring the respective sequence to a respective queue of a plurality of queues, in accordance with the length of the respective sequence; and setting a global flag to flush all open respective queues; receiving, at the second module, a garbage collection write request from the first module; and in response to receiving the garbage collection write request and in accordance with the global flag, performing one or more operations for a garbage collection write, including: identifying open respective queues for writing to a destination unit, wherein open respective queues contain one or more sequences of valid data; and writing from the open respective queues to the destination unit.

(B2) In some embodiments of the method of B1, at least one of the identified open respective queues is not full.

(B3) In some embodiments of the method of B2, writing from the open respective queues to the destination unit includes combining open respective queues that are not full to minimize unused space in the destination unit.

(B4) In some embodiments of the method of any of B1 to B3, the plurality of queues comprises buffer memory distinct from non-volatile memory in the destination unit.

(B5) In some embodiments of the method of any of B1 to B4, each sequence of the one or more sequences of valid data in the source unit includes one or more logical pages of valid data.

(B6) In some embodiments of the method of any of B1 to B5, identifying the one or more sequences of valid data in the source unit includes: for each respective sequence of valid data, determining whether the respective sequence has the first length, the second length, or the third length by: determining whether the respective sequence has the third length; in accordance with a determination that the respective sequence does not have the third length, determining whether the respective sequence has the second length; and in accordance with a determination that the respective sequence does not have the second length, determining whether the respective sequence has the first length.

(B7) In some embodiments of the method of any of B1 to B6, transferring the respective sequence to the respective queue of the plurality of queues, in accordance with the length of the respective sequence, includes: in accordance with a determination that the respective sequence of valid data has the first length, transferring the respective sequence of valid data into a first queue of a first type; in accordance with a determination that the respective sequence of valid data has the second length, transferring the respective sequence of valid data into a second queue of a second type; and in accordance with a determination that the respective sequence of valid data has the third length, transferring the respective sequence of valid data into a third queue of a third type.

(B8) In some embodiments of the method of B7, the first queue, the second queue, and the third queue are the same size.

(B9) In some embodiments of the method of any of B7 to B8, in the plurality of queues, queues of the first type of queue each hold single logical pages.

(B10) In some embodiments of the method of any of B7 to B9, in the plurality of queues, queues of the second type of queue each hold at least one sequence of logical pages of at least the second length.

(B11) In some embodiments of the method of any of B7 to B10, in the plurality of queues, queues of the third type of queue each hold at least one sequence of logical pages of at least the third length.

(B12) In some embodiments of the method of any of B7 to B11, the method further includes: in accordance with a determination that the first queue of the first type is full, allocating a fourth queue of the first type; in accordance with a determination that the second queue of the second type is full, allocating a fifth queue of the second type; and in accordance with a determination that the third queue of the third type is full, allocating a sixth queue of the third type.

(B13) In some embodiments of the method of any of B1 to B12, writing from the open respective queues to the destination unit includes writing from the open respective queues in sequence, from oldest open respective queue to newest open respective queue, to the destination unit.

(B14) In some embodiments of the method of any of B1 to B13, the method further includes: after writing from the open respective queues to the destination unit, marking the block as eligible for erasing.

(B15) In some embodiments of the method of any of B1 to B14, the storage device comprises one or more flash memory devices.

(B16) In another aspect, a storage device includes (1) non-volatile memory (e.g., comprising one or more non-volatile storage devices, such as flash memory devices), (2) a storage controller for the storage device, the storage controller including a first module and a second module, (3) one or more processors, and (4) controller memory (e.g., non-volatile memory or volatile memory in or coupled to the controller) storing one or more programs, which when executed by the one or more processors cause the storage device to perform or control performance of any of the methods B1 to B15 described herein.

(B18) In yet another aspect, any of the methods B1 to B15 described above are performed by a storage device including means for performing any of the methods described herein.

(B20) In yet another aspect, a storage system includes (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods B1 to B15 described herein.

(B21) In yet another aspect, some embodiments include a non-transitory computer readable storage medium, storing one or more programs configured for execution by one or more processors of a storage device, the one or more programs including instructions for performing any of the methods B1 to B15 described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120, which includes a storage controller 124 and a storage medium 130, and is used in conjunction with or includes a computer system 110. In some embodiments, storage medium 130 is a single flash memory device while in other embodiments storage medium 130 includes a plurality of flash memory devices. In some embodiments, storage medium 130 is NAND-type flash memory or NOR-type flash memory. In some embodiments, storage medium 130 includes one or more three-dimensional (3D) memory devices, as further defined herein. Further, in some embodiments storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera and/or any number of supplemental devices to add functionality. In some embodiments, computer system 110 does not have a display and other user interface components.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 124 and storage medium 130 are included in the same device (i.e., an integral device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded memory controller. Storage medium 130 may include any number (e.g., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives.

Additionally and/or alternatively, flash memory device(s) can also be configured for relatively smaller-scale applications such as personal flash drives or hard-disk replacements for personal, laptop, and tablet computers. In some embodiments, storage medium 130 includes one or more three-dimensional (3D) memory devices, as further defined herein.

Storage medium 130 is divided into a number of addressable and individually selectable blocks, such as selectable portion 131. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

As noted above, while data storage densities of non-volatile semiconductor memory devices are generally increasing, a drawback of increasing storage density is that the stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, storage controller 124 includes a management module 121, a host interface 129, a storage medium I/O interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 121 includes one or more processing units (CPUs, also sometimes called processors) 122 configured to execute instructions in one or more programs (e.g., in management module 121). In some embodiments, the one or more CPUs 122 are shared by one or more components within (e.g., Front End (FE) 126 and Flash Manager (FM) 127), and in some cases, beyond the function of storage controller 124. Management module 121 is coupled to host interface 129, additional module(s) 125 and storage medium I/O 128 in order to coordinate the operation of these components. In some embodiments, one or more modules of management module 121 are implemented in a management module of computer system 110 (not shown). In some embodiments, one or more processors of computer system 110 (not shown) are configured to execute instructions in one or more programs in the management module of computer system 110 (not shown) and the management module of computer system 110 is coupled to storage device 120 in order to manage the operation of storage device 120.

Additional module(s) 125 are coupled to storage medium I/O 128, host interface 129, and management module 121. As an example, additional module(s) 125 may include an error control module to limit the number of uncorrectable errors inadvertently introduced into data during writes to memory or reads from memory. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code to produce a codeword, which is subsequently stored in storage medium 130. When the encoded data (e.g., one or more codewords) is read from storage medium 130, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in storage medium 130 from computer system 110. The data received by host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell.

The encoding format of the storage media (e.g., TLC, MLC, or SLC and/or a chosen data redundancy mechanism) is a choice made when data is actually written to the storage media. Often in this specification there is described an event, condition, or process that is said to set the encoding format, alter the encoding format of the storage media, etc. It should be recognized that the actual process may involve multiple steps, e.g., erasure of the previous contents of the storage media followed by the data being written using the new encoding format and that these operations may be separated in time from the initiating event, condition or procedure.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems. Further, blindly gathering valid data in a source block (e.g., the old block) and re-writing the valid data to a destination block (e.g., the new block) can degrade the performance of host read operations after garbage collection.

As used herein, the term "host" or "host system" may be construed to mean (1) a computer system (e.g., computer system 110, FIG. 1) on behalf of which data is stored in a storage system (e.g., data storage system 100, FIG. 1), (2) a storage system controller of a storage system, (3) a cluster controller of a storage system, and/or (4) any computing entity (e.g., a computer, a process running on a computer, a mobile phone, an internet kiosk, a tablet computer, a laptop computer, a desktop computer, a server computer, etc.) that is operatively coupled either directly or indirectly to a storage system, depending on the context. Further, in some contexts, the host is or includes a client or client system, on behalf of which data is stored in a storage system.

Figure 2:
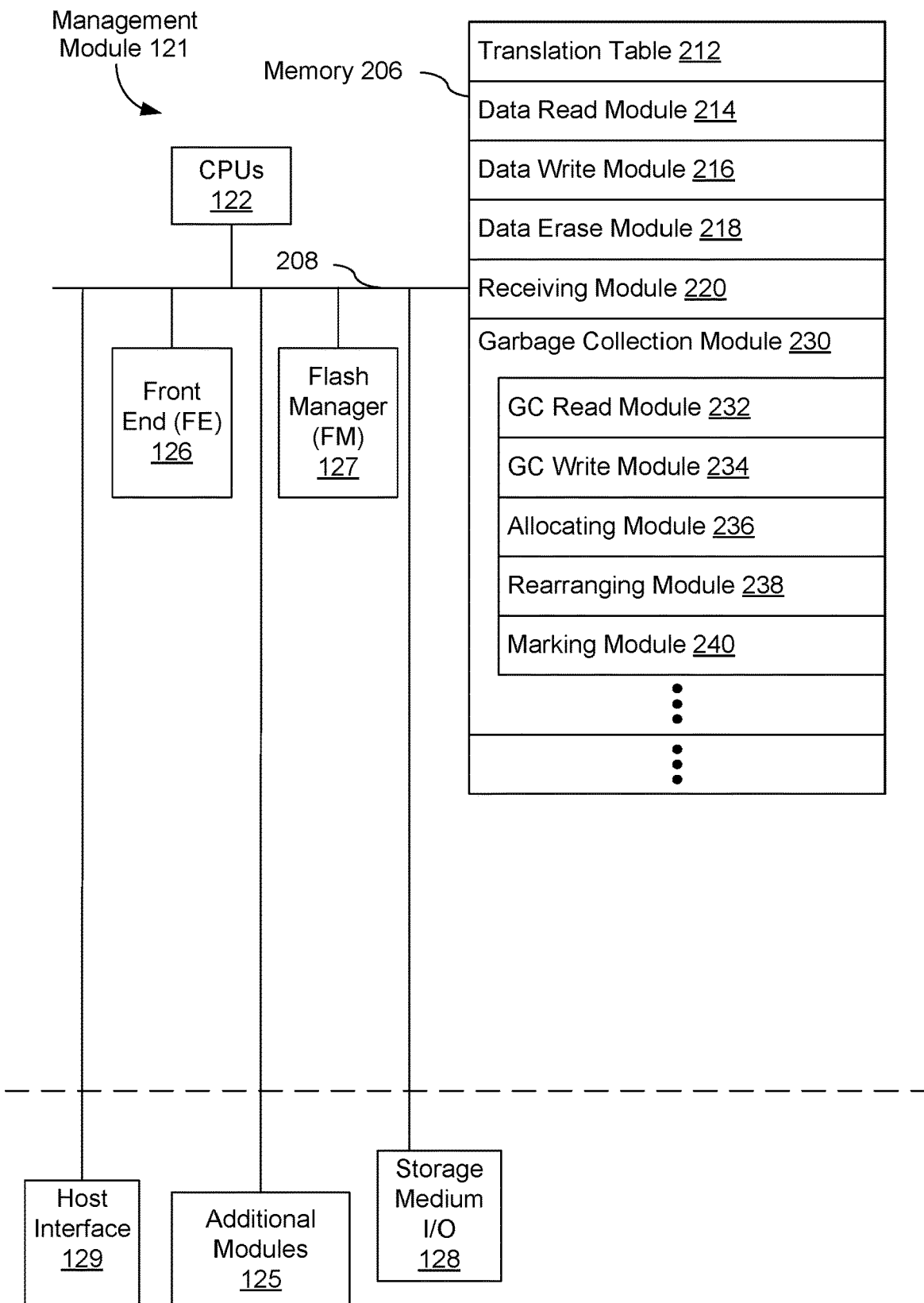
FIG. 2 is a block diagram illustrating an implementation of a management module, in accordance with some embodiments.
Figure 4A:
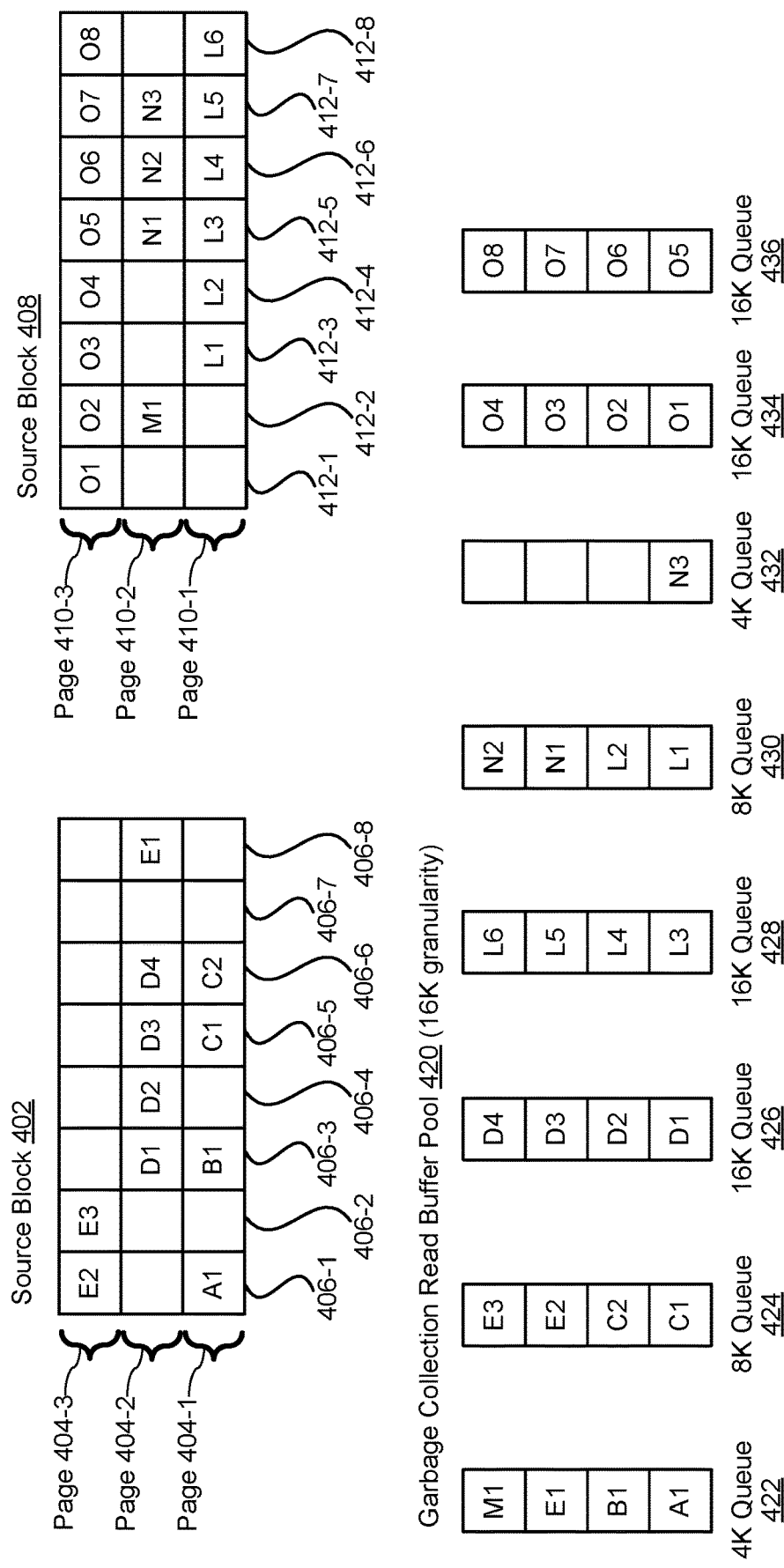
FIGS. 4A-4B illustrate locality grouping during garbage collection, in accordance with some embodiments.

FIG. 2 is a block diagram illustrating a management module 121 in accordance with some embodiments, as shown in FIG. 1. Management module 121 typically includes one or more processing units (sometimes called CPUs or processors) 122 for executing modules, programs and/or instructions stored in memory 206 and thereby performing processing operations, memory 206 (sometimes called controller memory), and one or more communication buses 208 for interconnecting these components. Management module 121 optionally includes front end (FE) 126, which is responsible for tasks such as updating address tables (e.g., translation table 212), deciding which source blocks to garbage collect, and deciding when to perform garbage collection. Further, management module 121 optionally includes flash manager (FM) 127, which is responsible for carrying out garbage collection commands from front end 126. The one or more communication buses 208 optionally include circuitry (sometimes called a chipset) that interconnects and controls communications between system components. Management module 121 is coupled to host interface 129, additional module(s) 125, and storage medium I/O 128 by the one or more communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- translation table 212 that is used for mapping logical addresses to physical addresses;
- data read module 214 that is used for reading data from one or more codewords, pages or blocks in a storage medium (e.g., storage medium 130, FIG. 1);
- data write module 216 that is used for writing data to one or more codewords, pages or blocks in a storage medium (e.g., storage medium 130, FIG. 1);
- data erase module 218 that is used for erasing data from one or more blocks in a storage medium (e.g., storage medium 130, FIG. 1);
- receiving module 220 that is used for receiving garbage collection requests; in some embodiments each garbage collection request specifies a source unit from which valid data is to be garbage collected; and
- garbage collection module 230 that is used for garbage collection for one or more blocks in a storage medium (e.g., storage medium 130, FIG. 1), optionally including:
  - garbage collection (GC) read module 232 that is used for performing one or more operations for a garbage collection read;
  - garbage collection (GC) write module 242 that is used for performing one or more operations for a garbage collection write;
  - allocating module 236 that is used for allocating one or more queues for garbage collection (e.g., in garbage collection read buffer pool 420, FIG. 4A);

rearranging module 238 that is used for rearranging one or more sequences of valid data in garbage collection queues (e.g., in garbage collection read buffer pool 420, FIG. 4A) to group logically sequential data together; and marking module 240 that is used for marking blocks as eligible for erasing after completion of garbage collection.

In some embodiments, memory 206, or the non-transitory computer readable storage medium of memory 206 stores front end (FE) 126, implemented as a software module, and flash manager (FM) 127, also implemented as a software module. In some embodiments, flash manager (FM) 127 includes receiving module 220 and garbage collection module 230. In some embodiments, flash manager (FM) 127 also includes data read module 214, data write module 216, and data erase module 218, or portions of those modules.

Figure 3:
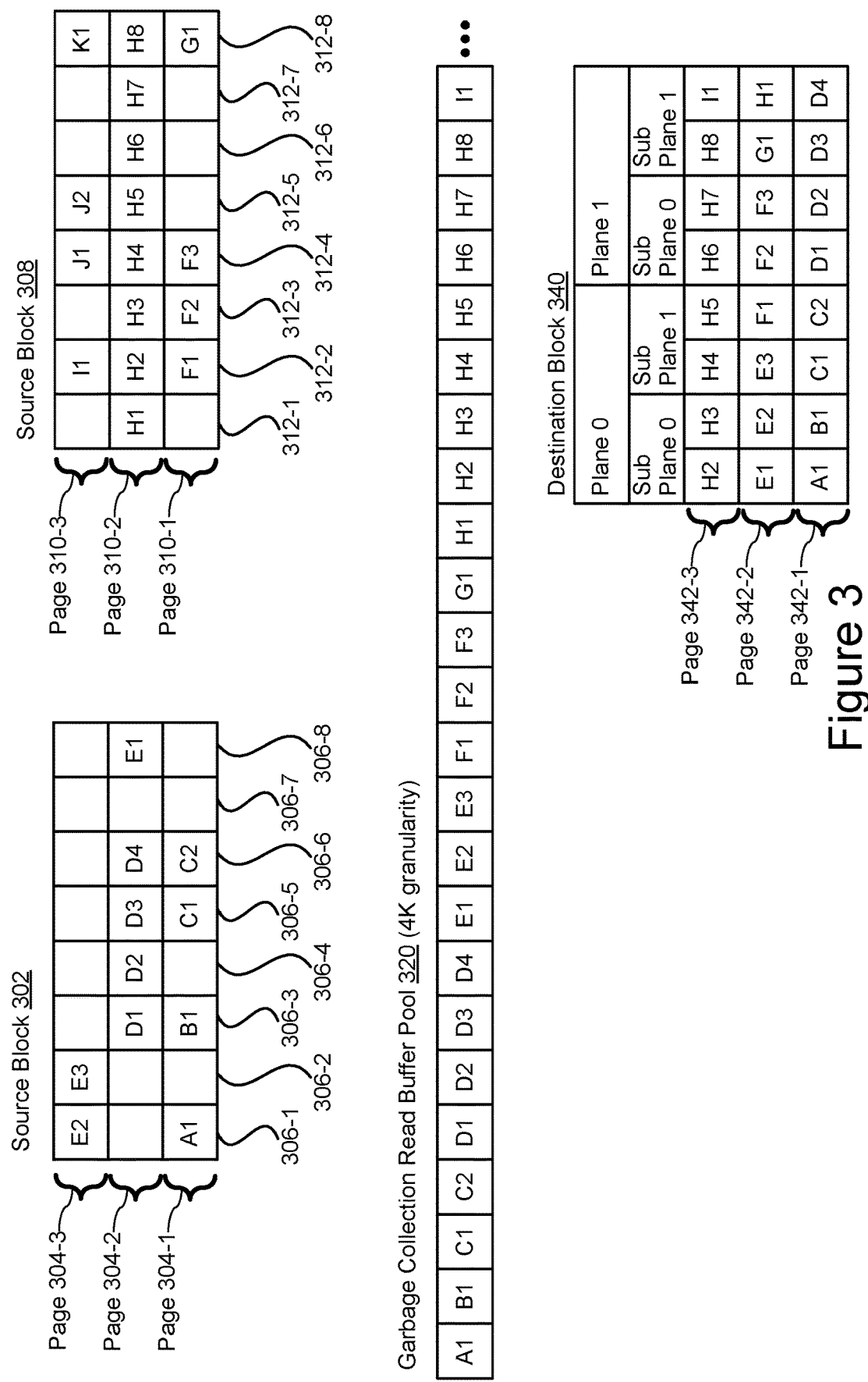
FIG. 3 illustrates a conventional implementation of garbage collection.

In some embodiments, memory 206, or the non-transitory computer readable storage medium of memory 206 includes garbage collection read buffer pool 320/420, and the queues (e.g., queues 422-436) implemented in garbage collection read buffer pool 320/420 (see FIGS. 3 and 4A).

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121 in accordance with some embodiments, FIG. 2 is intended more as a functional description of the various features which may be present in management module 121 than as a structural schematic of the embodiments described herein. In practice, and as recognized by those of ordinary skill in the art, the programs, modules, and data structures shown separately could be combined and some programs, modules, and data structures could be separated.

FIG. 3 illustrates a conventional implementation of garbage collection. As described above, garbage collection is a process of memory management that reclaims portions of memory that no longer contain valid data. If some portions of one or more source blocks (e.g., source block 302 and source block 308) contain invalid data, those portions cannot be overwritten until the whole block is erased. The process of garbage collection reads and re-writes the pages with valid data from the one or more source blocks (e.g., source block 302 and source block 308) into one or more destination blocks (e.g., destination block 340) and then erases the source blocks.

In the example of FIG. 3, valid data from source blocks 302 and 308 are copied into a temporary buffer (e.g., garbage collection read buffer pool 320), at the minimum granularity possible (e.g., 4K), and then the valid data is written to destination block 340 in a first to last order. This conventional implementation of garbage collection is subject to the buffers becoming interleaved due to multiple source blocks from multiple channels transferring data into the buffer pool (e.g., garbage collection read buffer pool 320). Even in the case where valid data from source blocks is copied into the temporary buffer one source block at a time (as illustrated in FIG. 3), physically sequential runs of valid data may become separated and unaligned with plane or sub plane boundaries.

As shown in FIG. 3, each box with an indicator (e.g., A1, B1, C1, etc.) illustrates a valid logical page (sometimes called an "L-page" or a "4K run") and adjacent boxes with the same letter indicator (e.g., D1, D2, D3, and D4) illustrate that the data is physically sequential. In this example, a block is 96K, consisting of 24 logical pages of 4K each, with an upper page, a middle page, and a lower page. For example, source block 302 has an upper page (e.g., page 304-3), a middle page (e.g., page 304-2), and a lower page (e.g., page 304-1), where the lower page 304-1 has 8 logical pages (e.g., L-pages 306-1 through 306-8), where in the lower page 304-1, L-pages 306-1, 306-3, 306-5 and 306-6 are valid L-pages (e.g., with valid data A1, B1, C1, and C2, respectively) and L-pages 306-2, 306-4, 306-7, and 306-8 are invalid L-pages (e.g., no longer contain valid data). Similarly, source block 308 has an upper page (e.g., page 310-3), a middle page (e.g., page 310-2), and a lower page (e.g., page 310-1), where the lower page 310-1 has 8 logical pages (e.g., L-pages 312-1 through 312-8), where in the lower page 310-1, L-pages 312-2, 312-3, 312-4, and 312-8 are valid L-pages (e.g., with valid data F1, F2, F3, and G1, respectively) and L-pages 312-1, 312-5, 312-6, and 312-7 are invalid L-pages (e.g., no longer contain valid data).

As valid data is read from the source blocks, garbage collection read buffer pool 320 is filled in page order, from lower page to middle page to upper page. Although it is possible that reads from source block 302 and source block 308 may be interleaved in garbage collection read buffer pool 320, in the example of FIG. 3, it is assumed that all valid data from source block 302 is read before reading valid data from source block 308. Once the valid data is populated in garbage collection read buffer pool 320, physically sequential runs are no longer distinguished and the buffers are treated equally as 4K units of valid data. Then, data is drained in 96K (e.g., a full sequence page, including lower page, middle page, and upper page, or 24 4K buffers) chunks to the destination block (e.g., destination block 340), where the 96K is taken from the beginning of garbage collection read buffer pool 320 and contains the set of 4K buffers in the 96K range. In conventional garbage collection, there is no heuristic to select buffers from buffer pool 320 for writing to destination block 340, so the first 24 buffers from garbage collection read buffer pool 320 are selected for the garbage collection write.

Blindly gathering valid data in this manner can degrade the performance of host read operations after garbage collection. For example, after garbage collection, the full middle page 310-2 from source block 308 that contained valid data H1 through H8 is split across two pages of destination block 340 (e.g., H1 is in middle page 342-2 and H2 through H8 are in upper page 342-3). To read the sequential chunk of H1 through H8, two sense commands would be required after garbage collection (to read H1 through H8 from destination block 340), where only one sense command was required prior to garbage collection (to read H1 through H8 from source block 308). Further, if wordlines are further divided into planes and sub planes (e.g., as shown in destination block 340), if single plane reads (e.g., reading plane 0 or plane 1) or fast reads (e.g., reading one or more sub planes) are used to reduce the sense time, maintaining sub-plane boundaries are beneficial. However, conventional garbage collection, as shown in FIG. 3, does not maintain plane or sub-plane boundaries.

Figure 4B:
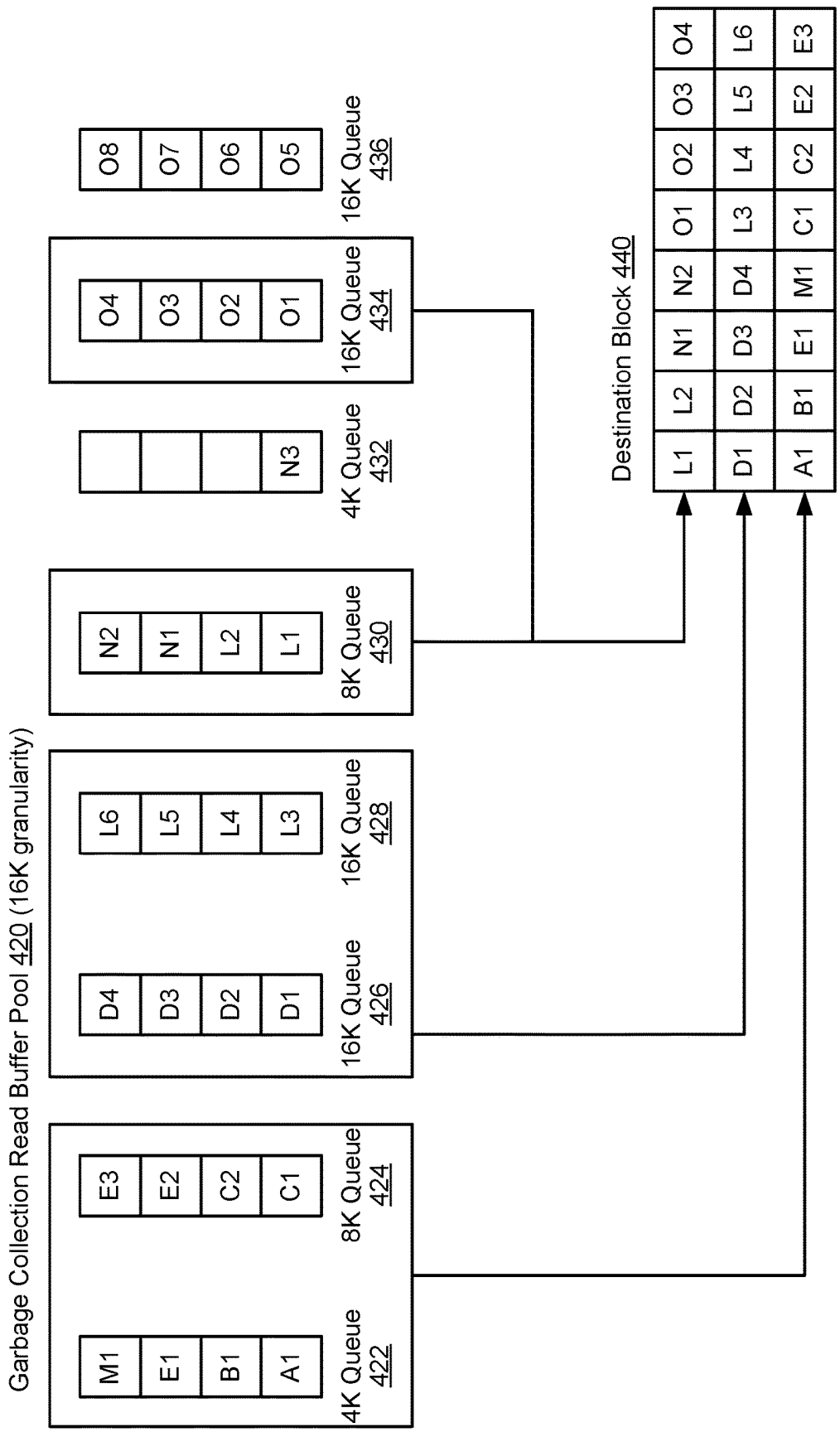

FIGS. 4A-4B illustrate locality grouping during garbage collection, in accordance with some embodiments. FIG. 4A illustrates a garbage collection read, in accordance with some embodiments, and FIG. 4B illustrates a garbage collection write, in accordance with some embodiments. As shown in FIG. 4A, instead of allocating garbage collection buffers with a 4K granularity (as shown in FIG. 3), garbage collection buffers are allocated with a virtual 16K granularity (e.g., with four 4K buffers), which are allocated and freed atomically. As a valid bitmap for a source block (e.g., a bitmap indicating which L-pages in the source block contain valid data) is processed, 16K-sized queues (sometimes called "extents" or "queue extents") of a particular type (e.g., 4K queue, 8K queue, or 16K queue) are allocated as needed, and sequential sequences (sometimes called "runs") of valid data are transferred from the source block to an appropriate queue (e.g., 4K queue, 8K queue, or 16K queue), according to the length of the sequential sequence of valid data. If a queue of a specific size is filled or not yet allocated, another queue of that size is allocated, as needed. In this manner, sequential runs of valid data are preserved and single (e.g., random) L-pages are not mixed with sequential runs. In some embodiments, front end 126 determines which source blocks are to be garbage collected. In some embodiments, flash manager 127 receives garbage collection read requests and garbage collection write requests from front end 126.

FIG. 4A illustrates a garbage collection read, in accordance with some embodiments. In the example in FIG. 4A, as valid data is read from the source blocks, garbage collection read buffer pool 420 is filled in page order from the source blocks, from lower page to middle page to upper page (e.g., lower page 404-1 to middle page 404-2 to upper page 404-3 of source block 402). Although it is possible that reads from source block 402 and source block 408 may be interleaved, in the example of FIG. 4A, it is assumed that all valid data from source block 402 is read before reading valid data from source block 408. As source block 402 is processed (e.g., in accordance with a valid bitmap for source block 402), lower page 404-1 is processed first. A1 in L-page 406-1 is identified as a single L-page of valid data (e.g., a "4K run" of valid data, where there is not a sequential run of valid data), and a 16K-sized queue for 4K length sequences (e.g., 4K queue 422) is allocated in garbage collection read buffer pool 420. Then, valid data A1 is transferred to 4K queue 422. Continuing to process lower page 404-1 from source block 402, B1 in L-page 406-3 is identified as a single L-page of valid data. Since an open queue for 4K length sequences (e.g., 4K queue 422) is already allocated and has space available, valid data B1 is transferred to 4K queue 422. Continuing to process lower page 404-1 from source block 402, C1-C2 is identified as a sequence of valid data with a length of 8K (e.g., an "8K run" of valid data). Since there is no available queue for 8K length sequences, a 16K-sized queue for 8K length sequences (e.g., 8K queue 424) is allocated, using available buffers in garbage collection read buffer pool 420. Then valid data C1-C2 is transferred to 8K queue 424.

This process continues for the remaining pages of source block 402 (e.g., middle page 404-2 and upper page 404-3) to identify and transfer sequences of valid data (e.g., D1-D4 and E1 from middle page 404-2, and E2-E3 from upper page 404-3), and for the pages of source block 408 (e.g., lower page 410-1, middle page 410-2, and upper page 410-3, and L-pages 412-1 to 412-8) to identify and transfer sequences of valid data (e.g., L3-L6 and L1-L2 from lower page 410-1, N1-N2, M1, and N3 from middle page 410-2, and O1-O4 and O5-O8 from upper page 410-3) in L-pages 412-1 to 412-8. It is noted that the E1-E3 run of valid data was split across middle page 404-2 and upper page 404-3 of source block 402 and was treated as two independent runs of valid data (e.g., E1 and E2-E3). Further, the L1-L6 run of valid data and the N1-N3 run of valid data are split into different queue extents. The process and order in which sequences of valid data are identified are discussed below with respect to FIG. 5. As explained below, the algorithm identifies sequences of valid data of 16K, 8K, or 4K lengths and does not look for 24K runs, 32K runs or other odd-sized runs to attempt to maintain them. Although not shown here, in some embodiments, the algorithm identifies and stores other sizes of valid data runs (e.g., 12K, 24K, 32K, etc.). In such cases, the granularity of the queue extent is sized differently (e.g., with larger than 16K queue extents) to accommodate and maintain the different sizes of valid data runs. Despite splitting up the runs of valid data, the algorithm does not reduce the performance of the host read after garbage collection. In some cases, as discussed below with respect to FIGS. 7A-7B, the performance is improved, as sense operations which would have previously been on the same die can now be done in parallel since the valid data is split across more than one die and/or channel. Note that, in some embodiments, the order in which queues are allocated and/or that data is assigned to those queues may vary from the examples given here, for example in FIGS. 4A and 5.

FIG. 4B illustrates a garbage collection write, in accordance with some embodiments. After the garbage collection read in which valid data is read from the source blocks (as described above with respect to FIG. 4A), there is enough valid data to complete a 96K garbage collection write. In the example of FIG. 4B, full queues (e.g., queues that are complete) are identified for writing to destination block 440. Two full queues have enough valid data for a 32K physical page of a destination block and three sets of two full queues provide 96K of valid data for a garbage collection write to destination block 440. The queue extents are written for the garbage collection write from the oldest to newest, taking only full extents to fill the garbage collection write page. Here, 4K queue 422 and 8K queue 424 are written into the lower page of destination block 440, 16K queue 426 and 16K queue 428 are written into the middle page of destination block 440, and 8K queue 430 and 16K queue 434 are written into the upper page of destination block 440. When the valid data from the queues is written to the destination block, the queue extents are released, leaving two extents allocated (e.g., 4K queue 432 and 16K queue 436) at the end of the garbage collection write.

Figure 5:
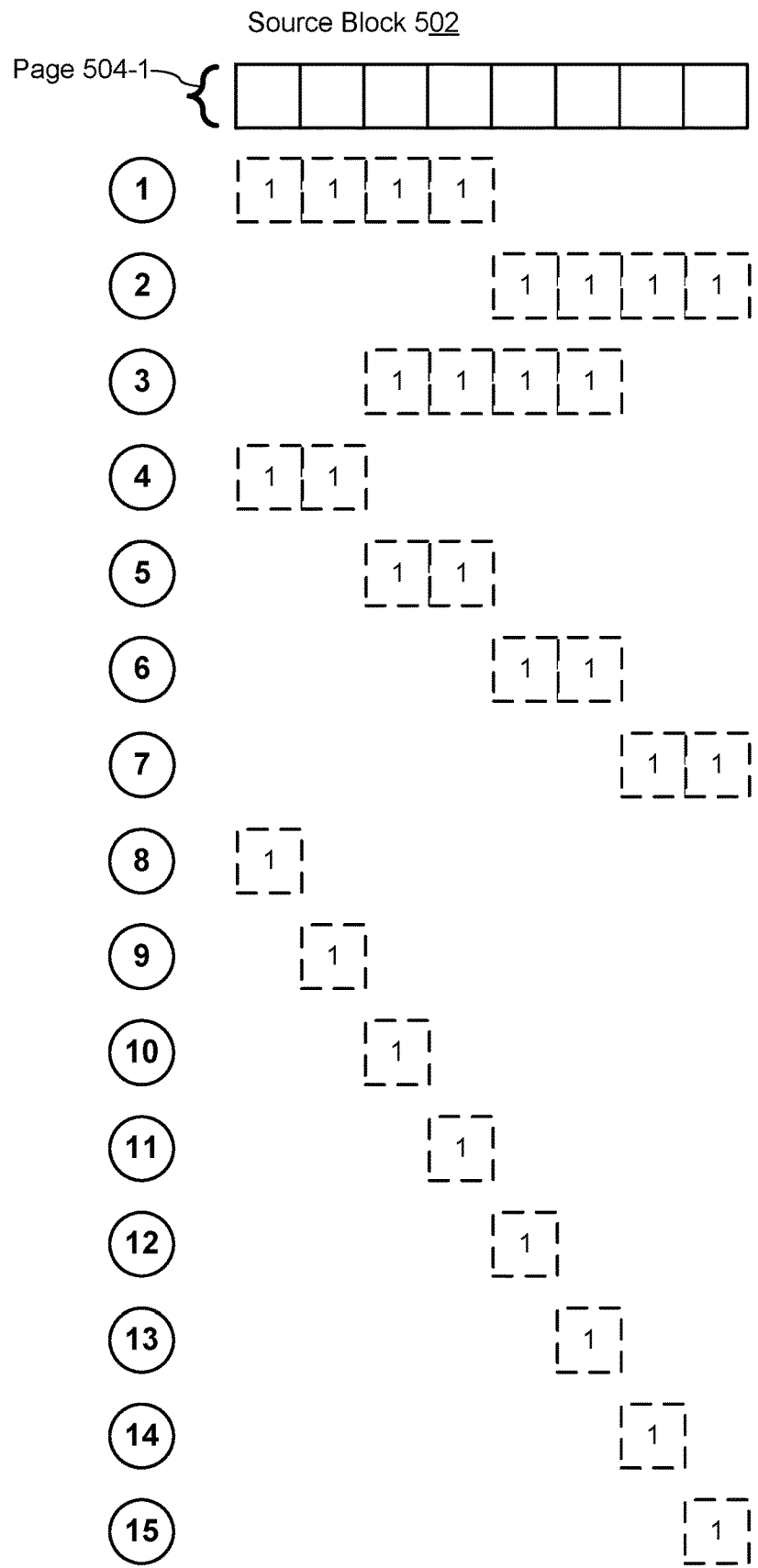
FIG. 5 illustrates various patterns used to detect sequences of valid data, in accordance with some embodiments.

FIG. 5 illustrates various patterns used to detect sequences (sometimes called "runs") of valid data, in accordance with some embodiments. One of the goals for detecting sequences of valid data is to keep processing to a minimum. Some conventional methods for detecting runs of valid data for garbage collection can be processor-intensive. Here, however, using a bitmask (or pattern) to detect sequences of valid data minimizes processing. As shown in FIG. 5, the illustrated set of patterns are tested against the valid bitmap for a particular page of a source block (e.g., page 504-1 of source block 502) to identify sequences of valid data in the source block and to which type of queue (e.g., 16K queue, 8K queue, or 4K queue) in the buffer pool the valid data should be transferred. FIG. 5 illustrates three patterns to check for 16K runs, four patterns to check for 8K runs, and eight patterns to check for 4K runs, where the patterns are checked in the order illustrated (e.g., 16K patterns are checked prior to 8K patterns, which are checked prior to 4K patterns) to maximally preserve sequential runs of valid data. Note that if the sequence of valid data does not match the larger run sizes (e.g., 16K patterns and 8K patterns), by process of elimination, the remaining valid data must match the smallest run size (e.g., 4K), which reduces the processing needed for detecting sequences of valid data. The patterns identify sequences of valid data of 16K, 8K, or 4K lengths and do not look for 24K runs, 32K runs, or other odd-sized/odd-aligned runs to attempt to maintain them. By using only three types of queue extents (e.g., 16K, 8K, or 4K), multiple benefits are obtained: (1) the overhead is lower, (2) 8K alignment is preserved, so data which would have previously been able to be read with a fast read (e.g., by reading a sub plane) can still be read with a fast read, and (3) the valid bitmap patterns used to identify queue extents to which valid data is to be transferred can be kept to a minimum number of patterns.

Figure 6A:
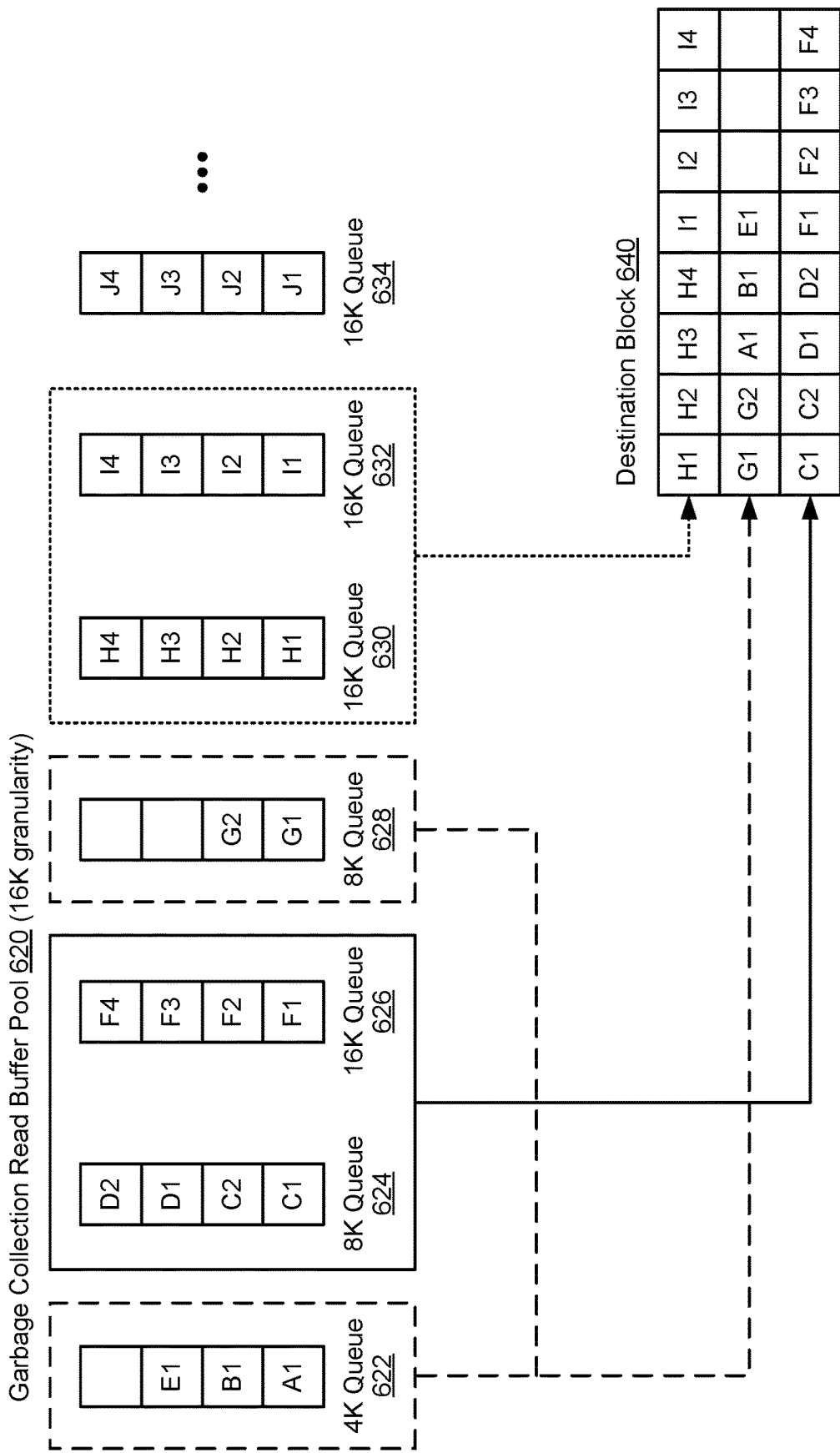
FIGS. 6A-6C illustrate garbage collection writes with incomplete queues, in accordance with some embodiments.
Figure 6B:
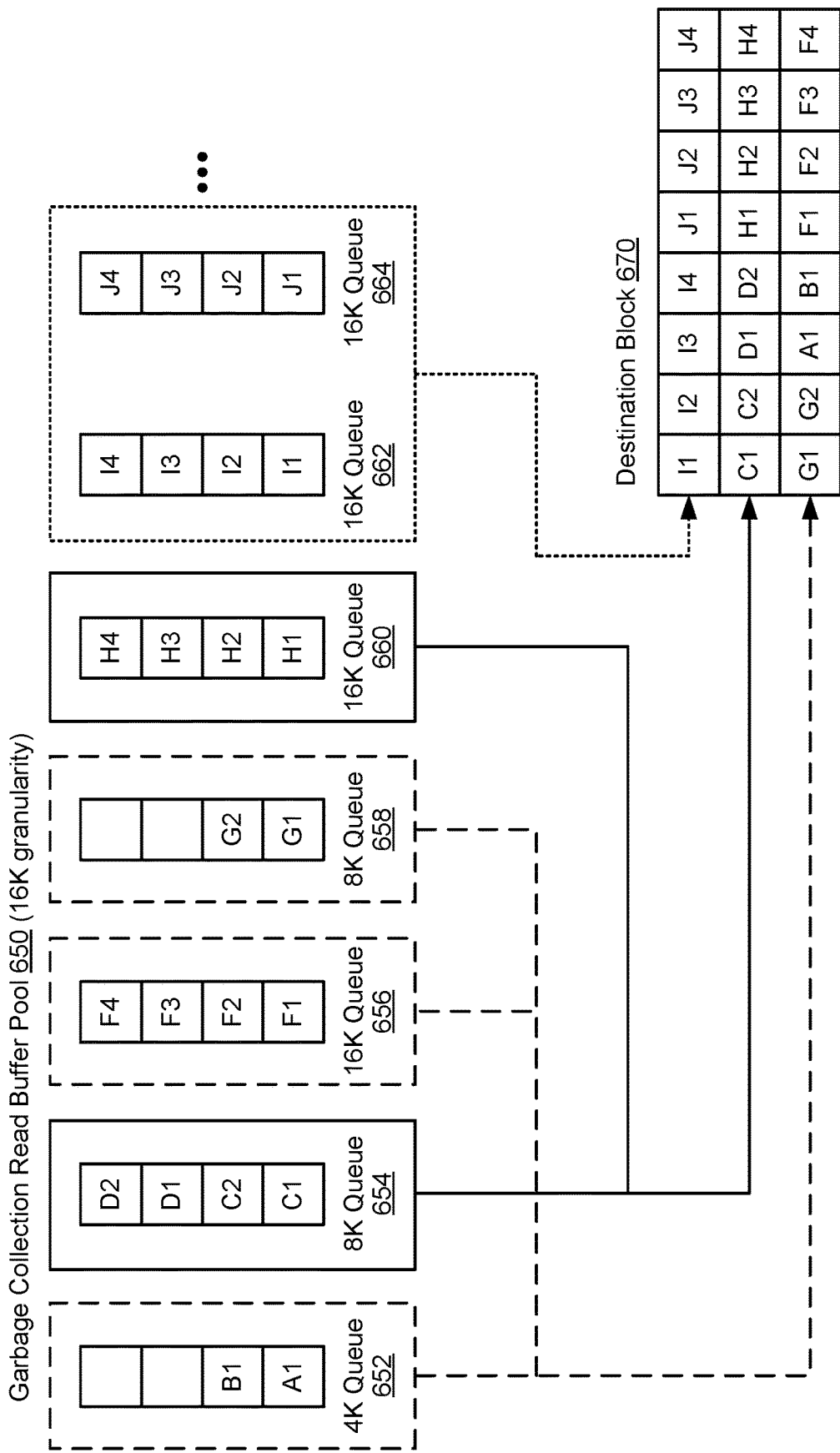
Figure 6C:
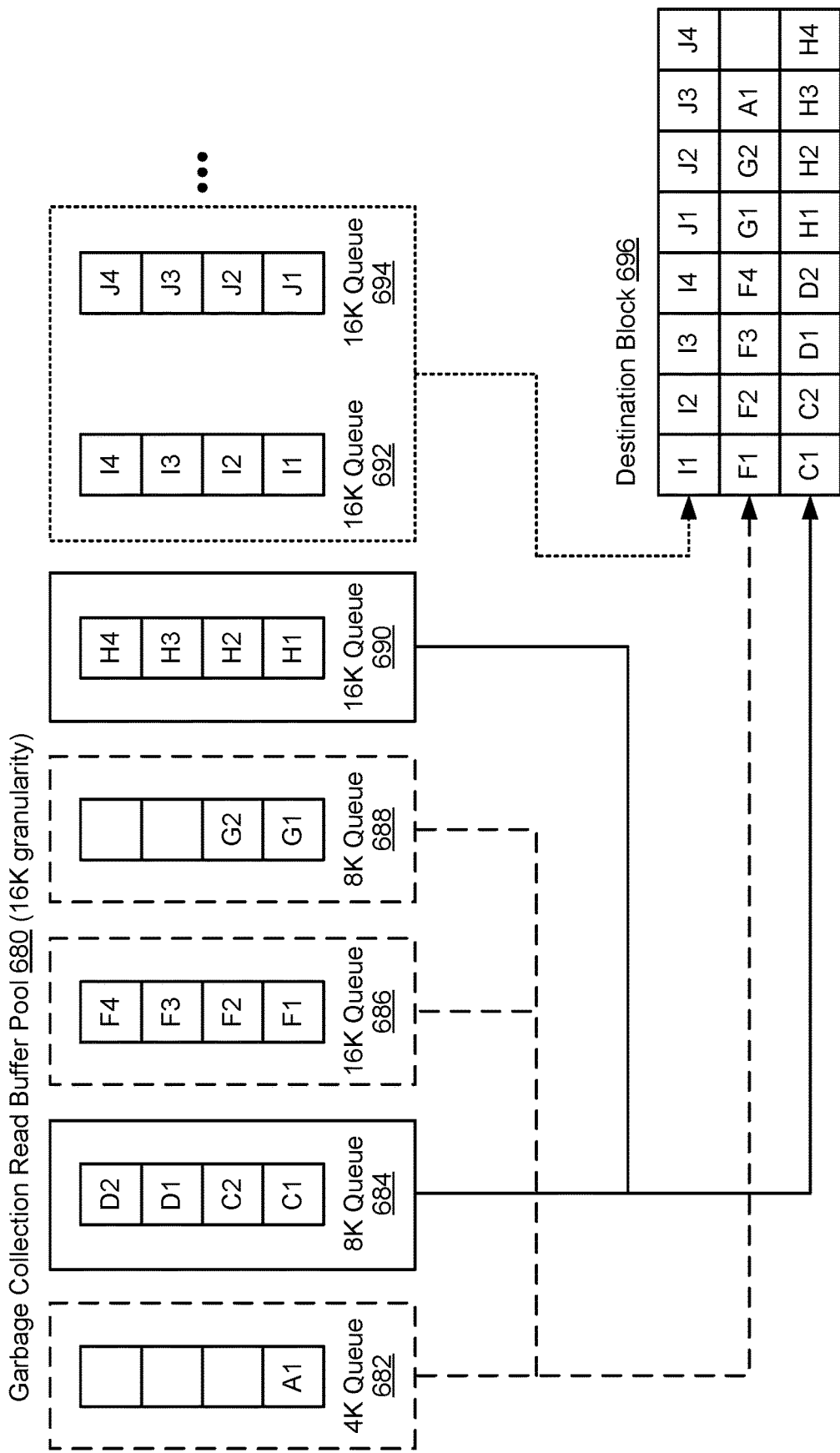

FIGS. 6A-6C illustrate garbage collection writes with incomplete (e.g., not full) queues, in accordance with some embodiments. As discussed above with respect to FIGS. 4A-4B, when allocating garbage collection buffers with a 16K granularity (which are allocated and freed atomically), it is possible that some of the queue extents are left incompletely filled with valid data (e.g., 4K queue 432, FIG. 4B), after all valid data has been read from a source block. Incompletely filled queue extents are sometimes called incomplete queue extents. In FIG. 4B, since only complete queue extents are written when filling the pages of a destination block for a garbage collection write, there may be some queue extents that are left incomplete for a significant length of time. This causes a problem for two reasons. First, incomplete queue extents do not use the garbage collection read buffer pool efficiently (e.g., in some implementations, where buffers are not allocated just in time, when the data is about to be transferred), which could lead to requirements for a larger buffer pool. Second, and more importantly, if the valid data which resides in an incomplete queue extent becomes the last valid L-page(s) in a source block, the open queue extent prevents the source block from being closed and eligible for erasing. This leads to significant trapped over provisioning in the storage device and may lead to increased garbage collection in order to free space from other blocks.

In some embodiments, the solution to this issue is to tag the garbage collection read request that contains the last valid pages in the source block (e.g., the read request is the last read needed to complete garbage collection of the source block). Then, when performing the garbage collection read (e.g., the final garbage collection read for the source block), in addition to identifying sequences of valid data and transferring them to appropriate queue extents (as discussed above with respect to FIG. 4B), a global flag is set to indicate that the next garbage collection write request should flush all open queue extents (e.g., including incomplete queue extents). This guarantees that any valid data waiting in an incomplete queue extent will be written and the source block can be closed at the end of the garbage collection write operation. This solution does mean that there will be unused space in the destination block, as described below in FIGS. 6A-6C. At most, it is possible for five 4K buffers to be "wasted" or unused in the incomplete queue extents (as shown in FIG. 6C). However, as shown below in FIGS. 6A-6C, this is not the worst case in terms of unused space in the destination block. In the examples shown below, five unused 4K buffers results in just one unused 4K page in the destination block, but three unused 4K buffers (see FIG. 6A) results in three unused 4K pages in the destination block.

FIGS. 6A-6C illustrate the possible combinations of incomplete queue extents and how they are optimally mapped to the destination block in a garbage collection write. In each case, the empty 4K buffers are placed in the middle page because the middle page in BiCS NAND (bit-cost scalable NAND, which is one type or class of 3D NAND devices) has the slowest read and is the least desirable place for data to be written. Thus, in some embodiments, the invalid or unused L-pages are placed in the middle page. However, the L-pages which are invalid are not left erased, since this is undesirable from the NAND perspective. Rather, in some embodiments, these invalid L-pages are padded with random data (e.g., a copy of another valid L-page, or simply random data from the read buffer pool). Since these invalid L-pages will never be referenced, the content of the data is not important.

FIG. 6A illustrates one combination of incomplete queue extents where three 4K buffers are unused in garbage collection read buffer pool 620. Here, 8K queue 624 and 16K queue 626 are written into the lower page of destination block 640, incomplete 8K queue 628 and incomplete 4K queue 622 are written into the middle page of destination block 640, and 16K queue 630 and 16K queue 632 are written into the upper page of destination block 640. After this garbage collection write, there are three L-pages (of 4K each) of unused space in destination block 640, which is the worst case scenario of unused space in the destination block. As shown below in FIGS. 6B-6C, even when there are additional unused 4K buffers in the incomplete queue extents, there is less unused space in the destination block.

FIG. 6B illustrates another combination of incomplete queue extents where four 4K buffers are unused in garbage collection read buffer pool 650. Here, incomplete 8K queue 658, incomplete 4K queue 652, and 16K queue 656 are written into the lower page of destination block 670, 8K queue 654 and 16K queue 660 are written into the middle page of destination block 670, and 16K queue 662 and 16K queue 664 are written into the upper page of destination block 670. After this garbage collection write, there is no unused space in destination block 670, despite four 4K buffers of unused space in the queue extents.

FIG. 6C illustrates yet another combination of incomplete queue extents where five 4K buffers are unused in garbage collection read buffer pool 680. Here, 8K queue 684 and 16K queue 690 are written into the lower page of destination block 696, 16K queue 686, incomplete 8K queue 688, and incomplete 4K queue 682 are written into the middle page of destination block 696, and 16K queue 692 and 16K queue 694 are written into the upper page of destination block 696. After this garbage collection write, there is one L-page of unused space in destination block 696, despite five 4K buffers of unused space in the queue extents.

Figure 7A:
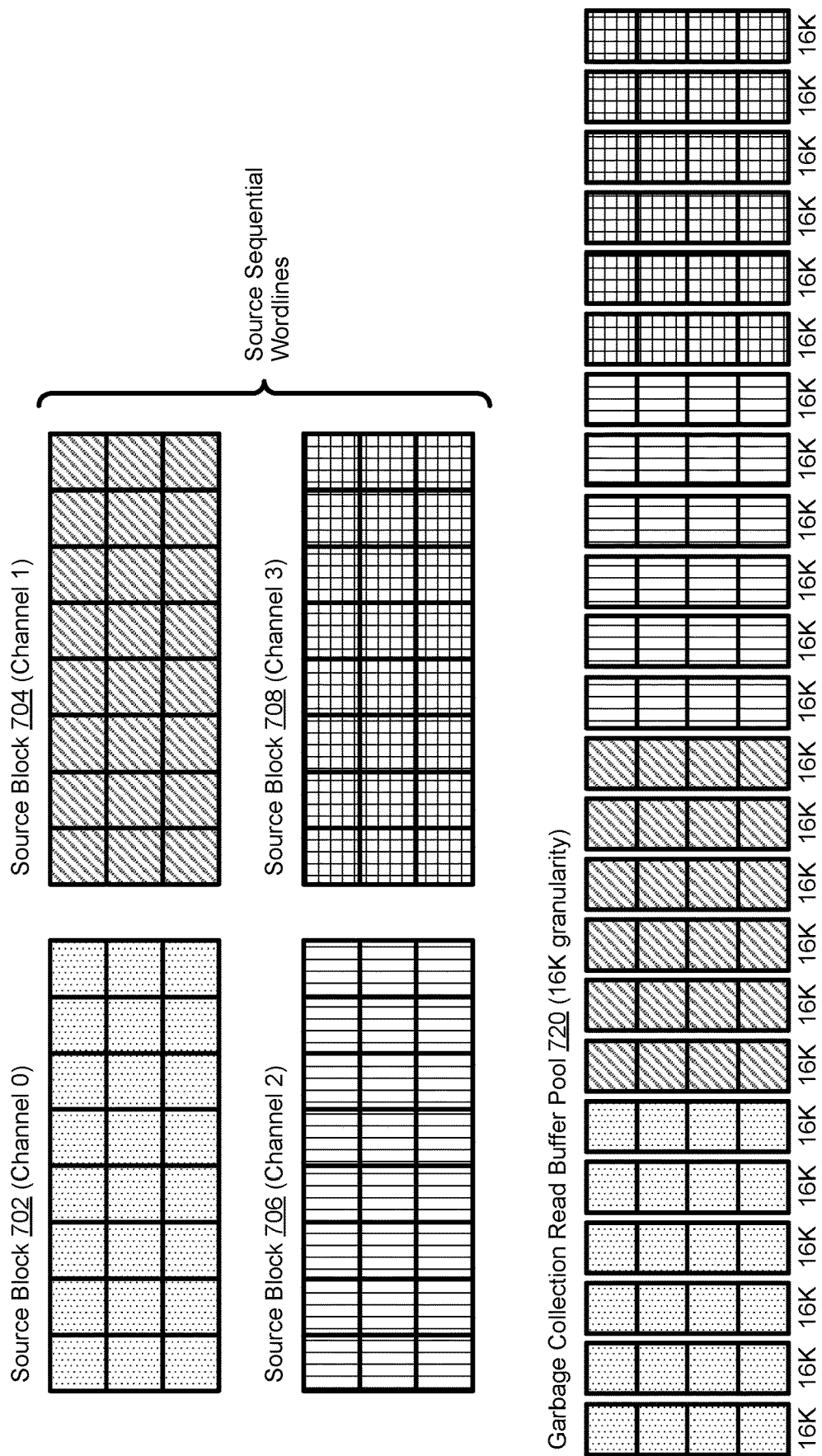
FIGS. 7A-7B illustrate locality grouping during garbage collection with multiple memory channels, in accordance with some embodiments.
Figure 7B:
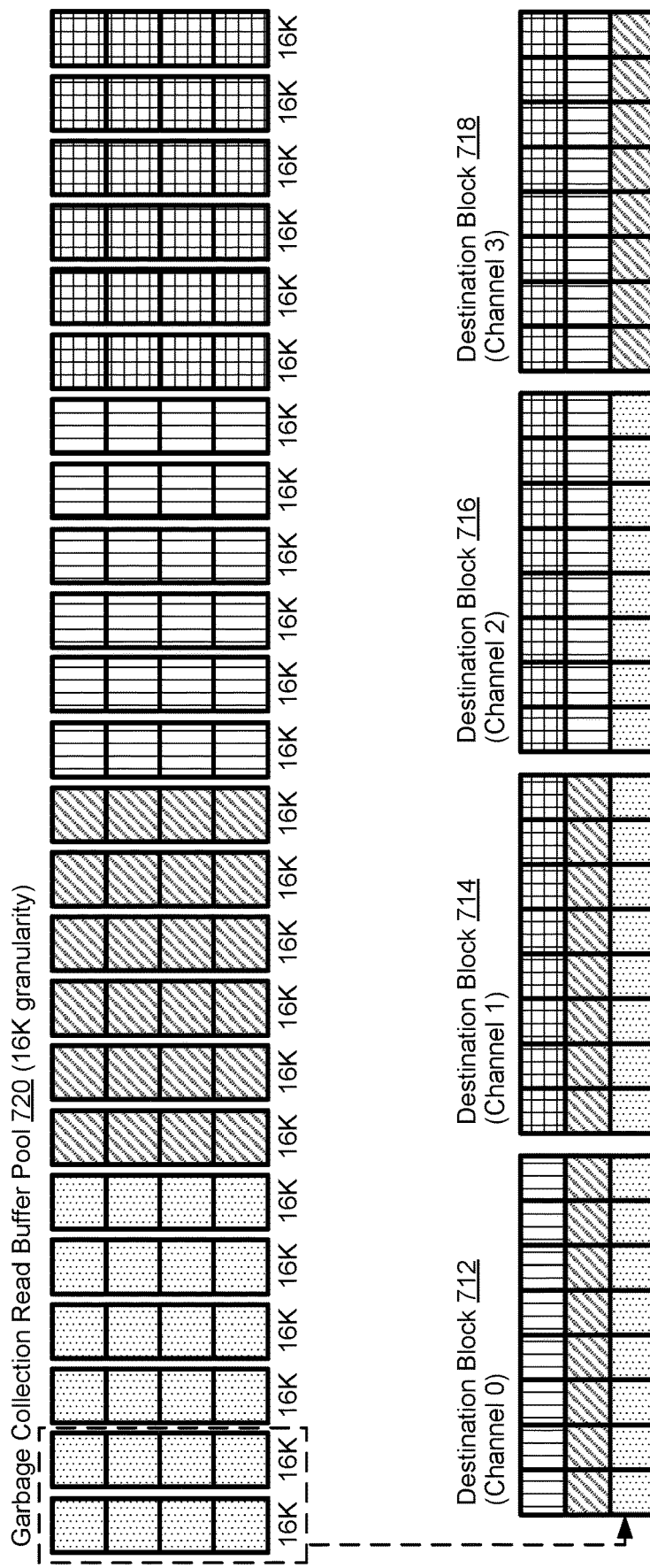
Figure 8A:
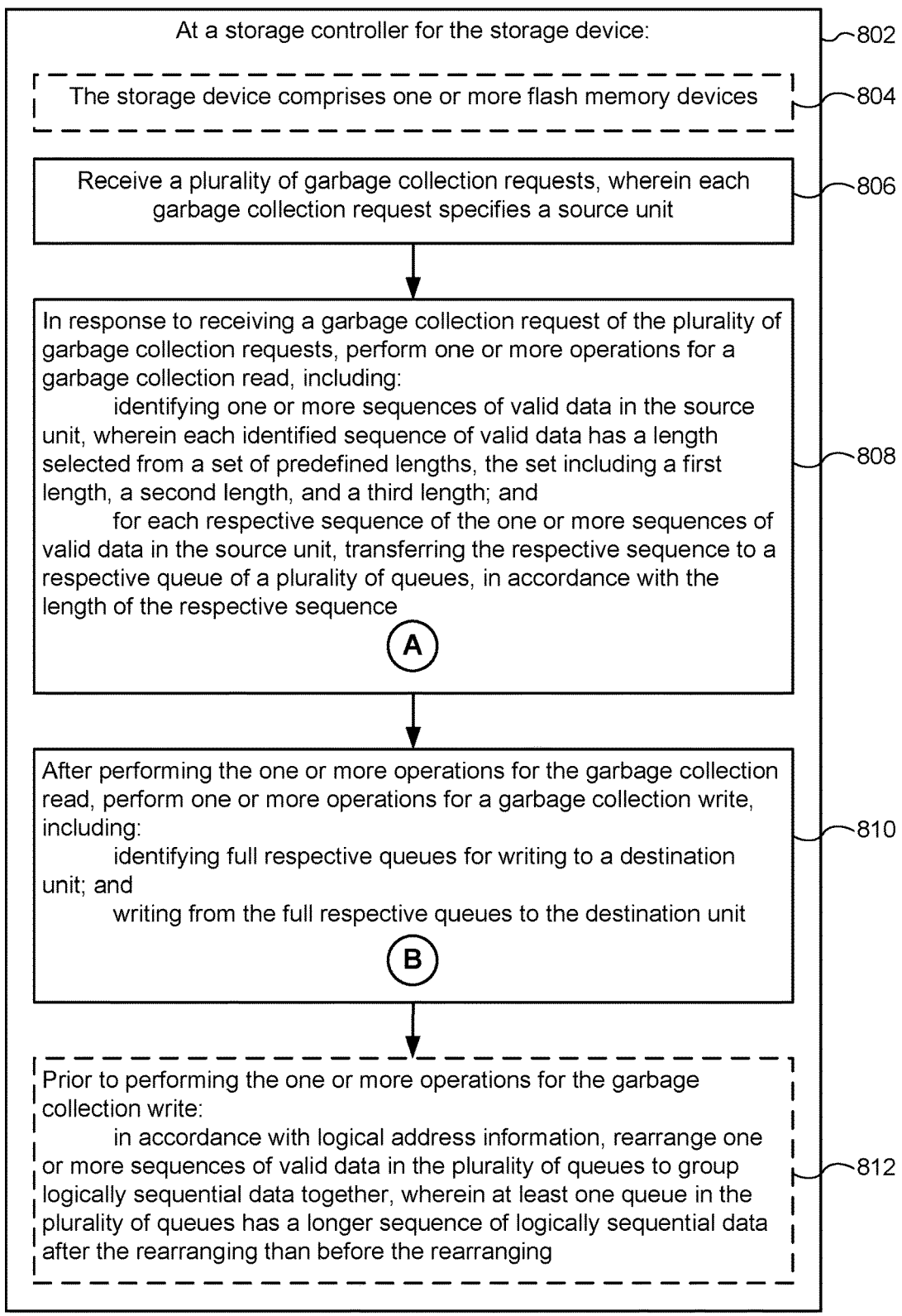
FIGS. 8A-8E illustrate a flowchart representation of a method of operating a storage device, in accordance with some embodiments.
Figure 8B:
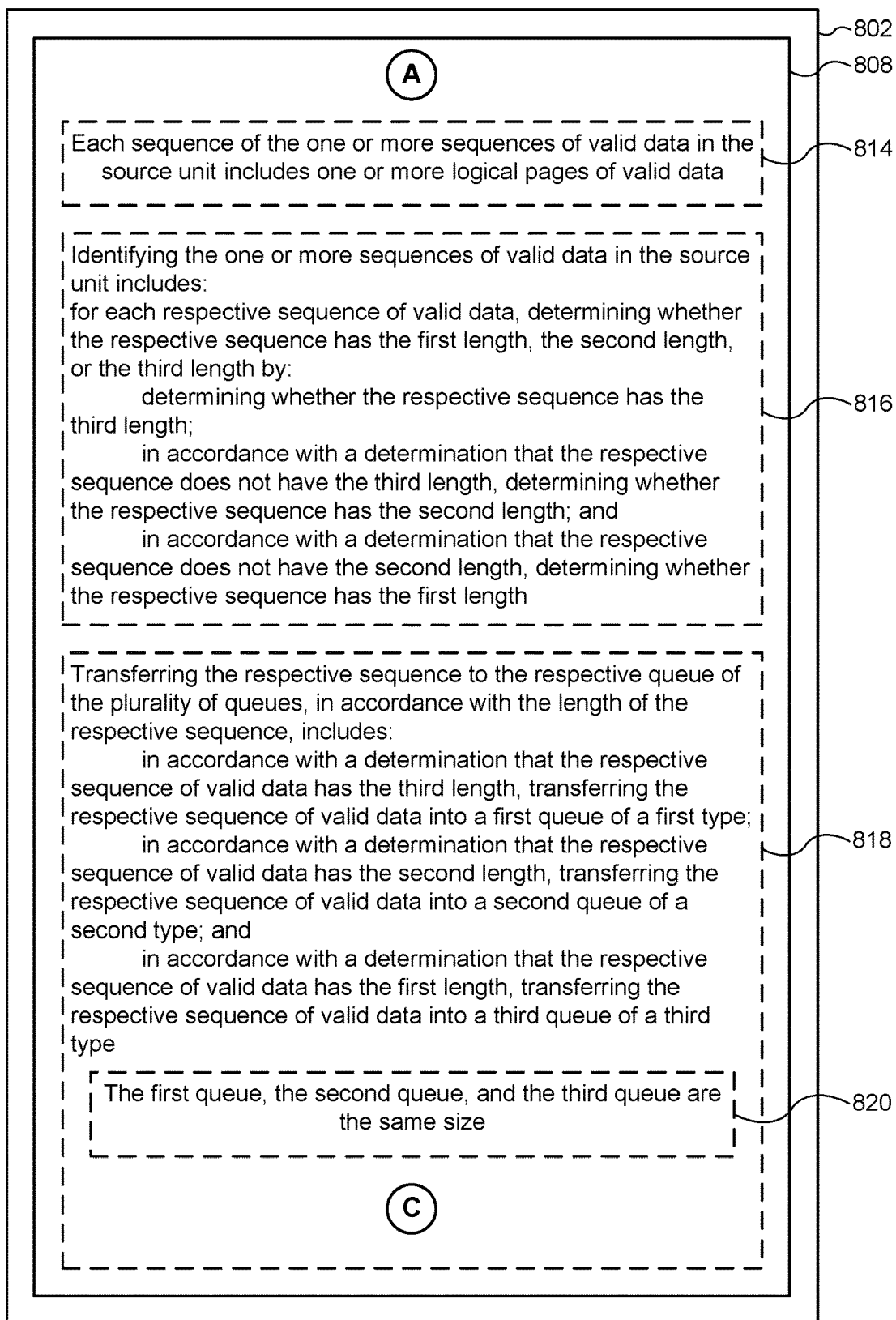
Figure 8C:
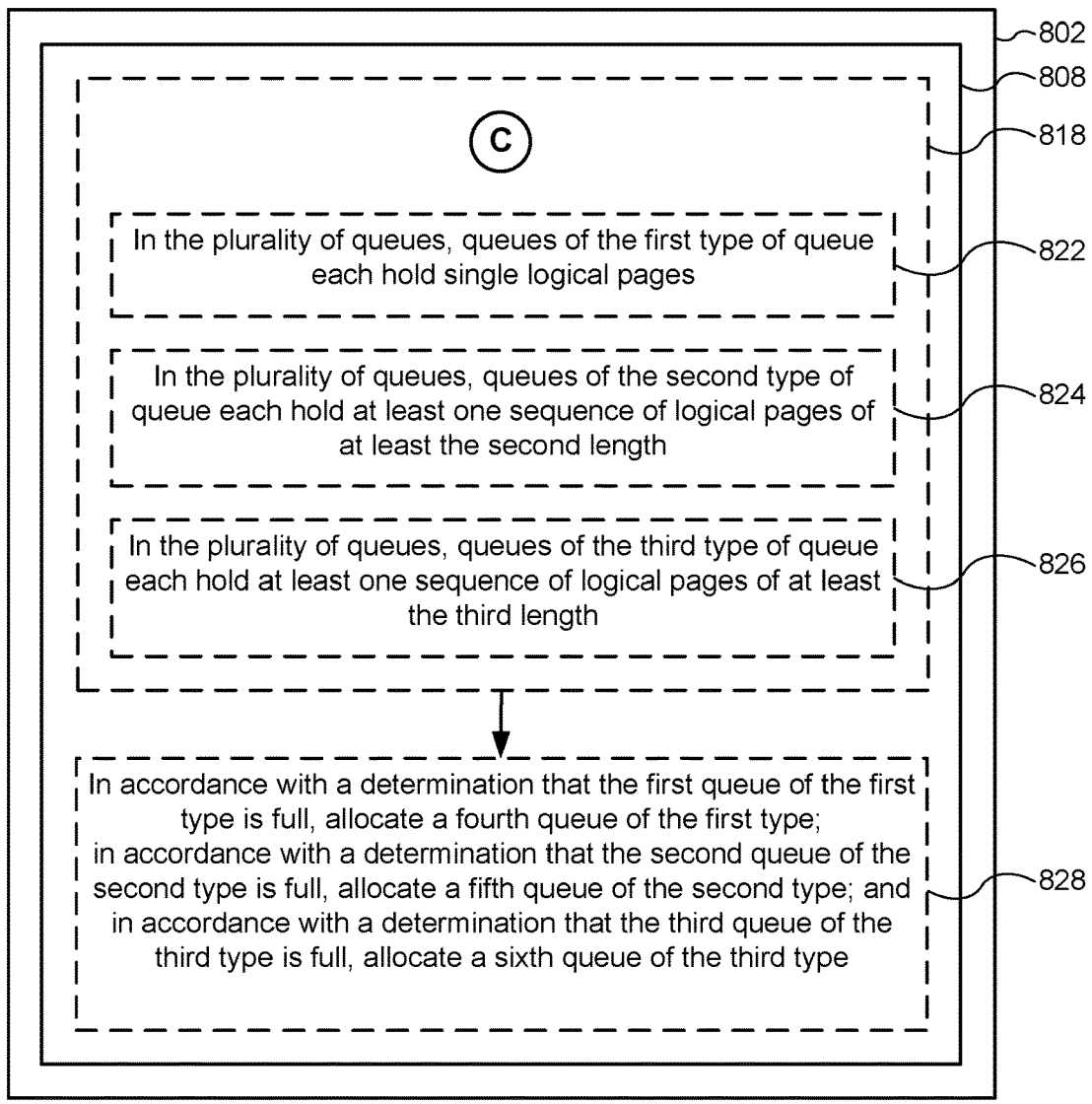
Figure 8D:
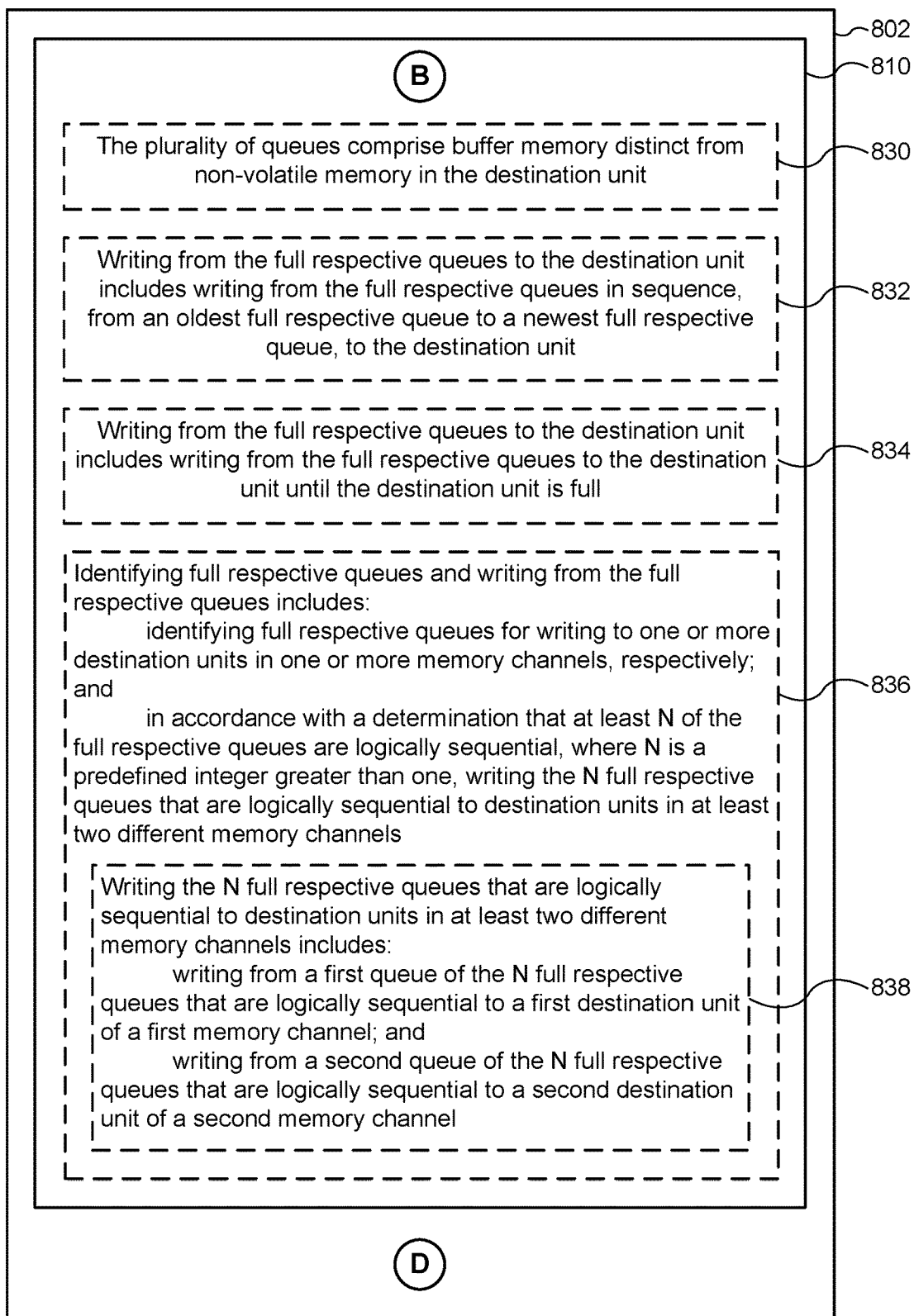
Figure 8E:
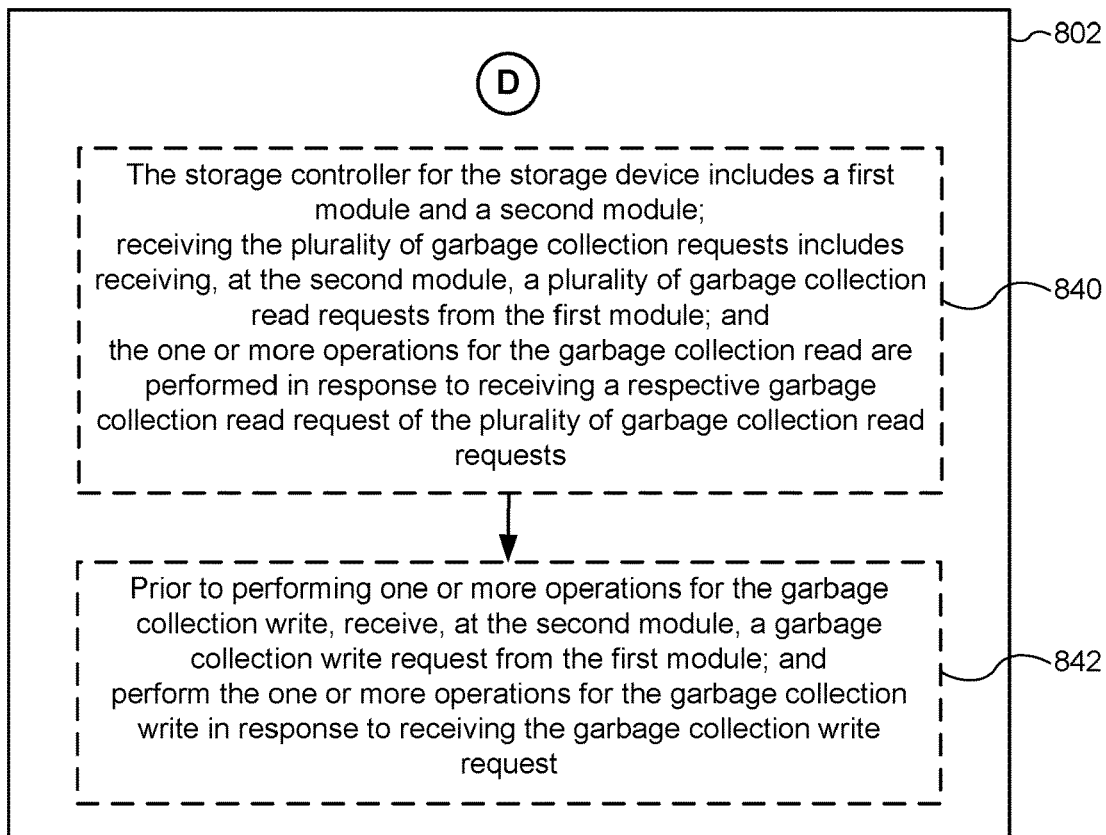
Figure 9A:
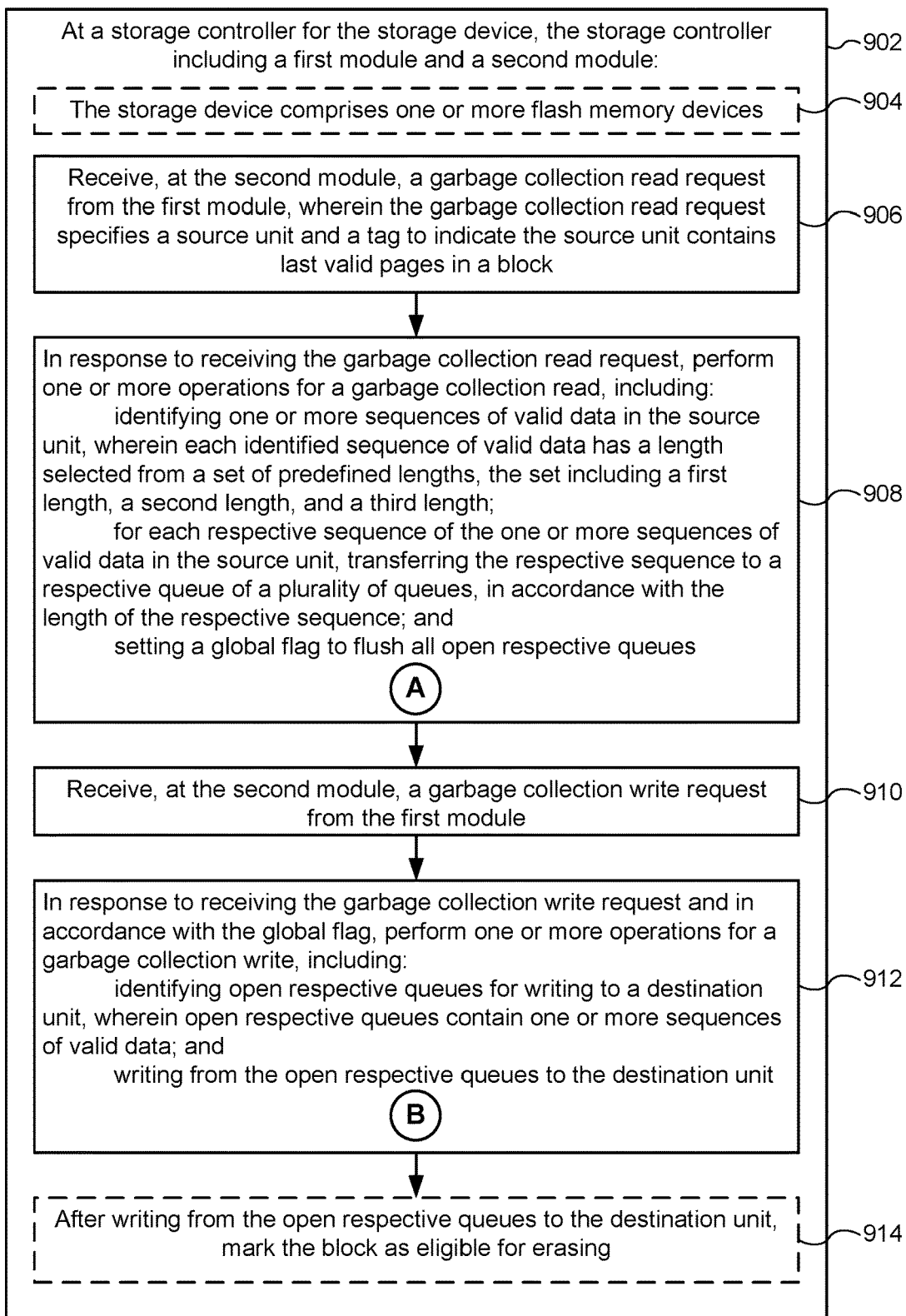
FIGS. 9A-9D illustrate a flowchart representation of a method of operating a storage device, in accordance with some embodiments.
Figure 9B:
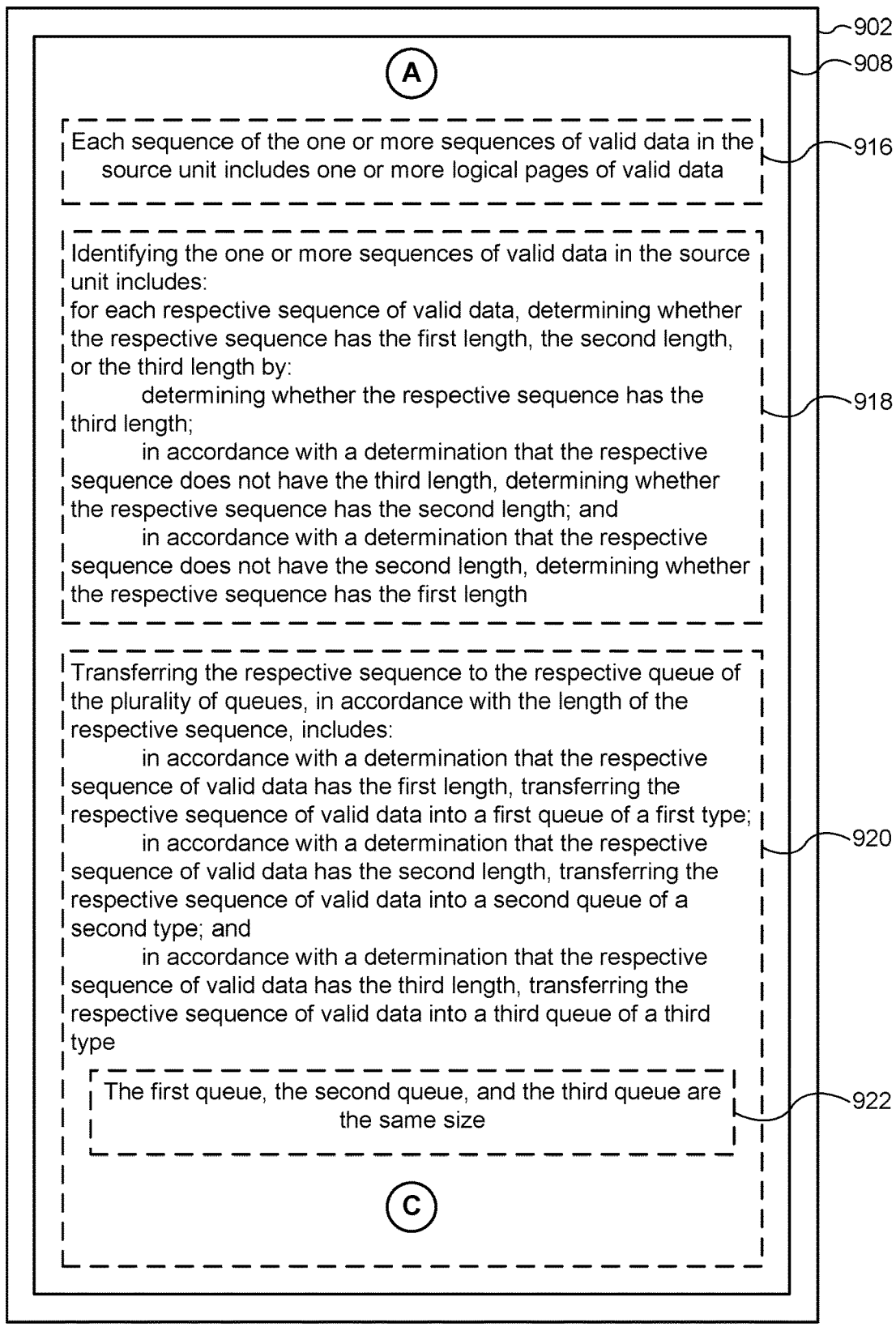
Figure 9C:
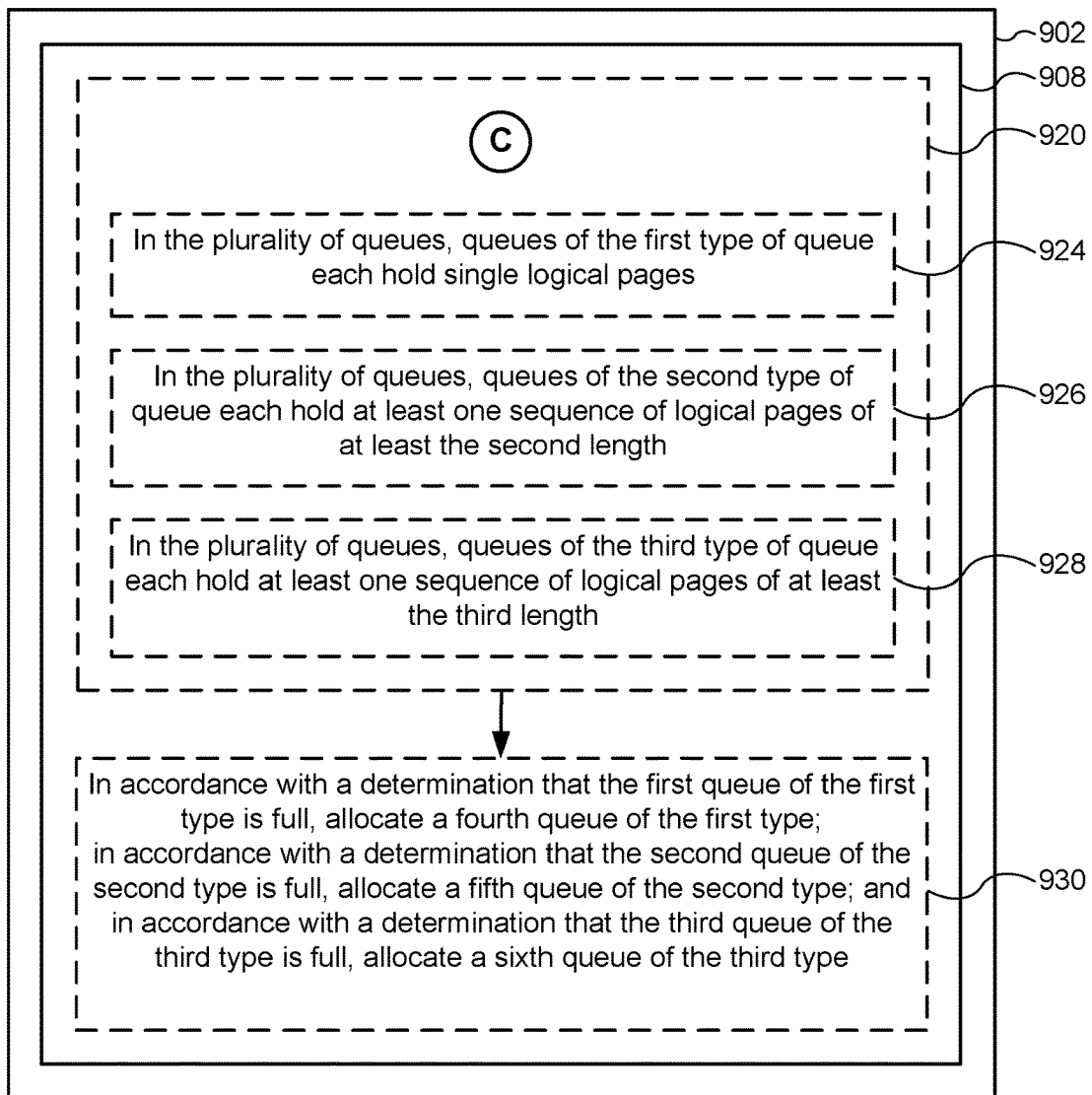
Figure 9D:
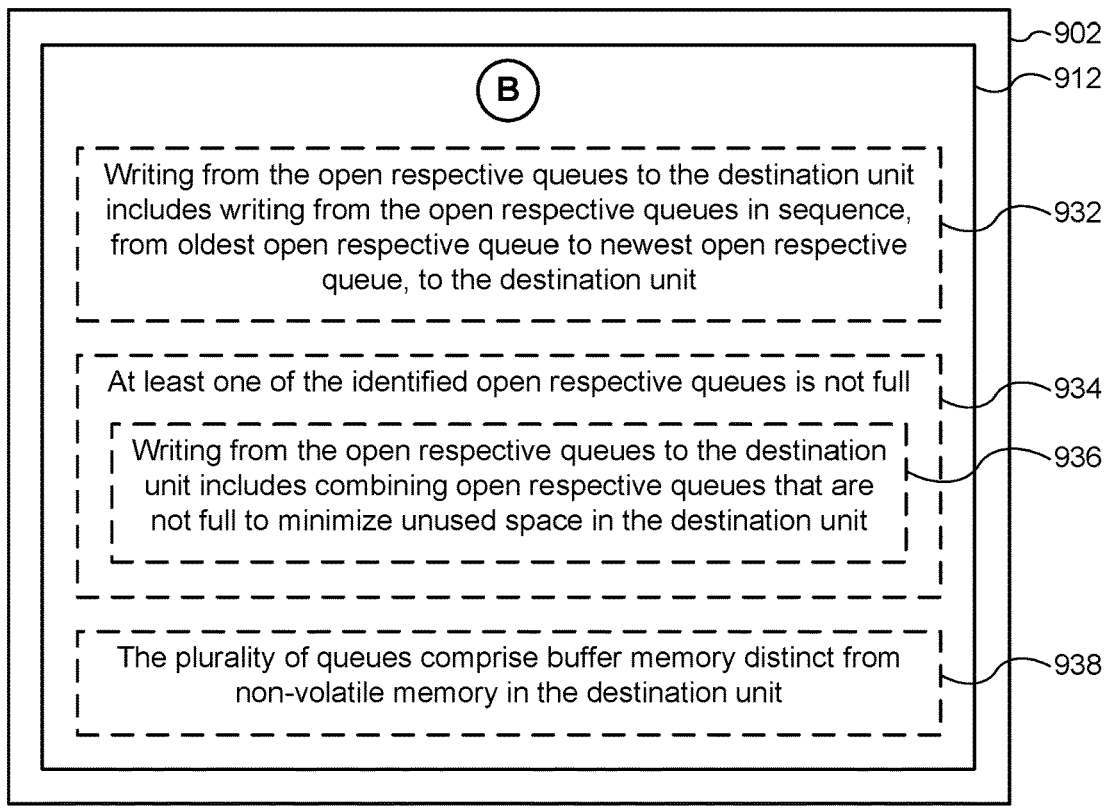

FIGS. 7A-7B illustrate locality grouping during garbage collection with multiple memory channels, in accordance with some embodiments. In some embodiments, the methods shown in the previous examples are further improved by taking into account the logical nature of the data. In the previous examples, the garbage collection read and write operations relied on the valid bitmap for the source block, which indicates physical adjacency. In many cases, this physical adjacency will also map to logical adjacency. In some embodiments, the storage device (e.g., Flash Manager 127) maintains a Flash Translation Index (FTI) with the previous physical address (e.g., the source physical location from which the valid data was read) and the new physical address (e.g., the destination physical location where the valid data is written). In some embodiments, this information is passed to Front End 126 from Flash Manager 127 when the garbage collection write is completed to enable correctly updating translation table 212 (FIG. 2).

In some embodiments, using the Flash Translation Index, Flash Manager 127 uses the stored logical information in conjunction with the queue extents to improve the performance of the system after garbage collection. As shown in FIG. 7A, valid data from source blocks 702, 704, 706, and 708 are written into garbage collection read buffer pool 720 during one or more garbage collection reads. In FIG. 7B, instead of writing a full 96K sequence page to a single channel/die before moving to the next channel/die to write the next 96K, based on the logical information, 96K logically sequential runs are spread across multiple channels (e.g., in destination blocks 712, 714, 716 and 718 of channels 0, 1, 2 and 3, respectively), thereby increasing the parallelism possible for future host reads of the sequential data.

FIGS. 8A-8E illustrate a flowchart representation of a method 800 of operating a storage device that includes non-volatile memory, in accordance with some embodiments. At least in some embodiments, method 800 is performed by a storage device (e.g., storage device 120, FIG. 1) or one or more components of the storage device (e.g., storage controller 124, FIG. 1), wherein the storage device is operatively coupled with a host system (e.g., computer system 110, FIG. 1). In some embodiments, method 800 is governed by instructions that are stored in a non-transitory computer readable storage medium and that are executed by one or more processors of a device, such as the one or more processing units (CPUs) 122 of management module 121, shown in FIGS. 1 and 2. In some embodiments, method 800 is performed by a storage system (e.g., data storage system 100, FIG. 1) or one or more components of the storage system (e.g., storage device 120, FIG. 1). In some embodiments, some of the operations of method 800 are performed at a storage device (e.g., storage device 120, FIG. 1) and information is transmitted to a host (e.g., computer system 110, FIG. 1).

At a storage controller for the storage device (802), the storage device (e.g., storage device 120, FIG. 1) receives (806) a plurality of garbage collection requests, wherein each garbage collection request specifies a source unit (e.g., a 96K source unit to garbage collect, such as source block 402 and/or source block 408, FIG. 4A). In some embodiments, a receiving module (e.g., receiving module 220, FIG. 2) is used to receive a plurality of garbage collection requests, wherein each garbage collection request specifies a source unit, as described above with respect to FIG. 2. In some embodiments, garbage collection requests are produced by a module (e.g., Front End module 126, FIGS. 1 and 2, or other not shown module) that detects a trigger condition, such as the number of erased blocks available for writing data falling below a threshold number, and that upon detecting the trigger condition, identifies, in accordance with predefined selection criteria, one or more blocks to be garbage collected. In some embodiments, the predefined selection criteria include, as at least one factor that prioritizes garbage collection of blocks having the least amount of valid data.

In some embodiments, the storage device comprises (804) one or more flash memory devices. In some embodiments, the storage device comprises a storage medium (e.g., storage medium 130, FIG. 1), and the storage medium comprises one or more non-volatile storage devices, such as flash memory devices. In some embodiments, the storage medium (e.g., storage medium 130, FIG. 1) is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., storage medium 130, FIG. 1) includes NAND-type flash memory or NOR-type flash memory. In other embodiments, the storage medium comprises one or more other types of non-volatile storage devices.

The storage device (e.g., storage device 120, FIG. 1), in response to receiving a garbage collection request of the plurality of garbage collection requests, performs (808) one or more operations for a garbage collection read, including: identifying (e.g., in accordance with a valid bitmap for the source unit) one or more sequences of valid data in the source unit, wherein each identified sequence of valid data has a length selected from a set of predefined lengths, the set including a first length (e.g., 4K), a second length (e.g., 8K), and a third length (e.g., 16K); and for each respective sequence of the one or more sequences of valid data in the source unit, transferring (e.g., reading and buffering) the respective sequence to a respective queue of a plurality of queues, in accordance with the length of the respective sequence (e.g., as described above with respect to FIG. 4A). Although in the examples here, the set of predefined lengths includes three lengths (e.g., 4K, 8K, and 16K), in some embodiments, the set of predefined lengths includes N lengths, where N is an integer number determined by one or more factors (e.g., available space to store patterns, CPU time to search for patterns, makeup of the NAND memory, host usage patterns, etc.). N is typically greater than 2.

In some embodiments, the valid bit map is specified by the garbage collection read request, while in some other embodiments, the valid bit map is obtained from a management data structure in accordance with the specified source unit. In some embodiments, a garbage collection (GC) read module (e.g., GC read module 232, FIG. 2) is used to perform one or more operations for a garbage collection read, including: identifying one or more sequences of valid data in the source unit, wherein each identified sequence of valid data has a length selected from a set of predefined lengths, the set including a first length, a second length, and a third length; and for each respective sequence of the one or more sequences of valid data in the source unit, transferring the respective sequence to a respective queue of a plurality of queues, in accordance with the length of the respective sequence, as described above with respect to FIG. 2.

In some embodiments, each sequence of the one or more sequences of valid data in the source unit includes (814) one or more logical pages of valid data. In some embodiments, a logical page (sometimes referred to as an "L-page") is the minimum granularity unit of data (e.g., 4K) for data read commands or data read operations.

In some embodiments, identifying the one or more sequences of valid data in the source unit includes (816): for each respective sequence of valid data, determining whether the respective sequence has the first length (e.g., 4K), the second length (e.g., 8K), or the third length (e.g., 16K) by: determining whether the respective sequence has the third length; in accordance with a determination that the respective sequence does not have the third length, determining whether the respective sequence has the second length; and in accordance with a determination that the respective sequence does not have the second length, determining whether the respective sequence has the first length. See, for example, FIG. 5 for patterns used to detect "runs" of valid data.

In some embodiments, transferring the respective sequence to the respective queue of the plurality of queues, in accordance with the length of the respective sequence, includes (818): in accordance with a determination that the respective sequence of valid data has the first length, transferring (e.g., reading and buffering) the respective sequence of valid data into a first queue of a first type (e.g., a 4K queue extent that can hold four sequences of 4K length each, such as 4K queue 422, FIG. 4A); in accordance with a determination that the respective sequence of valid data has the second length, transferring the respective sequence of valid data into a second queue of a second type (e.g., an 8K queue extent that can hold two sequences of 8K length each, such as 8K queue 424, FIG. 4A); and in accordance with a determination that the respective sequence of valid data has the third length, transferring the respective sequence of valid data into a third queue of a third type (e.g., a 16K queue extent that can hold one sequence of 16K length, such as 16K queue 426, FIG. 4A).

In some embodiments, the first queue, the second queue, and the third queue are (820) the same size (e.g., 4 pages or 16K).

In some embodiments, in the plurality of queues, queues of the first type of queue each hold (822) single logical pages. For example, queues of the first type of queue hold four sequences of 4K length each, each sequence of 4K length sometimes referred to as a "4K run" (e.g., 4K queue 422, FIG. 4A).

In some embodiments, in the plurality of queues, queues of the second type of queue each hold (824) at least one sequence of logical pages of at least the second length. For example, queues of the second type of queue hold two sequences of 8K length each, each sequence of 8K length sometimes referred to as an "8K run" (e.g., 8K queue 424, FIG. 4A).

In some embodiments, in the plurality of queues, queues of the third type of queue each hold (826) at least one sequence of logical pages of at least the third length. For example, queues of the third type of queue hold one sequence of 16K length, a sequence of 16K length sometimes referred to as a "16K run" (e.g., 16K queue 426, FIG. 4A).

In some embodiments, the storage device (e.g., storage device 120, FIG. 1): in accordance with a determination that the first queue of the first type is full, allocates (828) a fourth queue of the first type; in accordance with a determination that the second queue of the second type is full, allocates a fifth queue of the second type; and in accordance with a determination that the third queue of the third type is full, allocates a sixth queue of the third type. For example, in FIG. 4A, 16K queue 428 is allocated when 16K queue 426 is full, 8K queue 430 is allocated when 8K queue 424 is full, and 4K queue 432 is allocated when 4K queue 422 is full. In some embodiments, an allocating module (e.g., allocating module 236, FIG. 2) is used to allocate queues, as described above with respect to FIG. 2.

The storage device (e.g., storage device 120, FIG. 1), after performing the one or more operations for the garbage collection read, performs (810) one or more operations for a garbage collection write, including: identifying full respective queues for writing to a destination unit (e.g., full respective queues are queues that are complete); and writing from the full respective queues to the destination unit (e.g., as described above with respect to FIG. 4B). In some embodiments, a garbage collection (GC) write module (e.g., GC write module 234, FIG. 2) is used, after performing the one or more operations for the garbage collection read, to perform one or more operations for a garbage collection write, including: identifying full respective queues for writing to a destination unit and writing from the full respective queues to the destination unit, as described above with respect to FIG. 2.

In some embodiments, the plurality of queues comprises (830) buffer memory distinct from non-volatile memory in the destination unit (e.g., distinct from destination block 440, FIG. 4B).

In some embodiments, writing from the full respective queues to the destination unit includes (832) writing from the full respective queues in sequence, from an oldest full respective queue to a newest full respective queue, to the destination unit (e.g., as described above with respect to FIG. 4B, where 4K queue 422 is the oldest full queue).

In some embodiments, writing from the full respective queues to the destination unit includes (834) writing from the full respective queues to the destination unit until the destination unit is full (e.g., as described above with respect to FIG. 4B).

In some embodiments, identifying full respective queues and writing from the full respective queues includes (836): identifying full respective queues for writing to one or more destination units in one or more memory channels, respectively; in accordance with a determination that at least N of the full respective queues are logically sequential, where N is a predefined integer greater than one, writing the N full respective queues that are logically sequential to destination units in at least two different memory channels. In some embodiments, the predefined integer (N) is determined based on the queue size and memory channel width. For example, if the memory channel width is wider than the queue size (e.g., as shown in FIG. 7B), multiple full respective queues can fit in one memory channel, so N might need to be three or more for the full queues to be written in two different memory channels. In some embodiments, the at least two different memory channels can be accessed in parallel and/or concurrently.

In some embodiments, writing the N full respective queues that are logically sequential to destination units in at least two different memory channels includes (838): writing from a first queue of the N full respective queues that are logically sequential to a first destination unit of a first memory channel; and writing from a second queue of the N full respective queues that are logically sequential to a second destination unit of a second memory channel (e.g., as described above with respect to FIG. 7B).

In some embodiments, the storage controller for the storage device includes (840) a first module (e.g., a front-end module, sometimes referred to as the "Front End" or "FE") (e.g., Front End 126, FIGS. 1 and 2) and a second module (e.g., a back-end module, sometimes referred to as the "Flash Manager," the "Flash Monitor," and/or "FM") (e.g., Flash Manager 127, FIGS. 1 and 2). In some embodiments, receiving the plurality of garbage collection requests includes receiving, at the second module, a plurality of garbage collection read requests from the first module. In some embodiments, the one or more operations for the garbage collection read are performed in response to receiving a respective garbage collection read request of the plurality of garbage collection read requests.

In some embodiments, the storage device, prior to performing one or more operations for the garbage collection write, receives (842), at the second module, a garbage collection write request from the first module; and performs the one or more operations for the garbage collection write in response to receiving the garbage collection write request. In some embodiments, a receiving module (e.g., receiving module 220, FIG. 2) is used to receive, at the second module, a garbage collection write request from the first module and a garbage collection (GC) write module (e.g., GC write module 234, FIG. 2) is used to perform the one or more operations for the garbage collection write in response to receiving the garbage collection write request, as described above with respect to FIG. 2. In some embodiments, a garbage collection write request is generated by the first module (e.g., front end 126) and sent to the second module (e.g., flash manager 127) when a garbage collection write trigger condition is detected. In some embodiments, a garbage collection write trigger condition is detected when the number of complete or full queues in garbage collection read buffer pool 320/420 reaches or exceeds a threshold number.

In some embodiments, the storage device, prior to performing the one or more operations for the garbage collection write: in accordance with logical address information, rearranges (812) one or more sequences of valid data in the plurality of queues to group logically sequential data together, wherein at least one queue in the plurality of queues has a longer sequence of logically sequential data after the rearranging than before the rearranging. For example, in FIG. 4B, valid data N1-N3 is split between two queues (e.g., 8K queue 430 and 4K queue 432). If logical address information shows that this sequence is logically sequential (in addition to physically sequential as determined from the valid bitmap), in some embodiments, prior to performing the one or more operations for the garbage collection write, the storage device rearranges N1-N3 to keep the sequence together (e.g., by moving N1-N2 to 4K queue 432 with N3, resulting in 4K queue 432 having a longer sequence of logically sequential data after the rearranging than before the rearranging). In some embodiments, a rearranging module (e.g., rearranging module 238, FIG. 2) is used to rearrange one or more sequences of valid data in the plurality of queues to group logically sequential data together, wherein at least one queue in the plurality of queues has a longer sequence of logically sequential data after the rearranging than before the rearranging, as described above with respect to FIG. 2.

In some embodiments, any operations of method 800 described above are performed by a storage device, the storage device including (1) non-volatile memory (e.g., comprising one or more non-volatile storage devices, such as flash memory devices), (2) one or more processors, and (3) controller memory (e.g., non-volatile memory or volatile memory in or coupled to the controller) storing one or more programs, which when executed by the one or more processors cause the storage device to perform or control performance of any of the methods described herein.

In some embodiments, any operations of method 800 described above are performed by a storage device including means for performing any of the methods described herein.

In some embodiments, any operations of method 800 described above are performed by a storage system comprising (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods described herein.

Some embodiments include a non-transitory computer readable storage medium, storing one or more programs configured for execution by one or more processors of a storage device, the storage device including non-volatile memory, the one or more programs including instructions for performing any operations of method 800 described above.

FIGS. 9A-9D illustrate a flowchart representation of a method 900 of operating a storage device that includes non-volatile memory, in accordance with some embodiments. At least in some embodiments, method 900 is performed by a storage device (e.g., storage device 120, FIG. 1) or one or more components of the storage device (e.g., storage controller 124, FIG. 1), wherein the storage device is operatively coupled with a host system (e.g., computer system 110, FIG. 1). In some embodiments, method 900 is governed by instructions that are stored in a non-transitory computer readable storage medium and that are executed by one or more processors of a device, such as the one or more processing units (CPUs) 122 of management module 121, shown in FIGS. 1 and 2. In some embodiments, method 900 is performed by a storage system (e.g., data storage system 100, FIG. 1) or one or more components of the storage system (e.g., storage device 120, FIG. 1). In some embodiments, some of the operations of method 900 are performed at a storage device (e.g., storage device 120, FIG. 1) and information is transmitted to a host (e.g., computer system 110, FIG. 1).

At a storage controller for the storage device (902), the storage controller including a first module (e.g., a front-end module, sometimes referred to as the "Front End" or "FE") and a second module (e.g., a back-end module, sometimes referred to as the "Flash Manager," the "Flash Monitor," and/or "FM"): the storage device (e.g., storage device 120, FIG. 1) receives (906), at the second module, a garbage collection read request from the first module, wherein the garbage collection read request specifies a source unit (e.g., a 96K source unit to garbage collect, such as source block 402 and/or source block 408, FIG. 4A) and a tag to indicate the source unit contains last valid pages in a block. In some embodiments, a receiving module (e.g., receiving module 220, FIG. 2) is used to receive, at the second module, a garbage collection read request from the first module, wherein the garbage collection read request specifies a source unit and a tag to indicate the source unit contains last valid pages in a block, as described above with respect to FIG. 2. In some embodiments, garbage collection requests are produced by a module (e.g., Front End module 126, FIGS. 1 and 2, or other not shown module) that detects a trigger condition, such as the number of erased blocks available for writing data falling below a threshold number, and that upon detecting the trigger condition, identifies, in accordance with predefined selection criteria (described above with reference to FIGS. 8A-8E), one or more blocks to be garbage collected.

In some embodiments, the storage device comprises (904) one or more flash memory devices. In some embodiments, the storage device comprises a storage medium (e.g., storage medium 130, FIG. 1), and the storage medium comprises one or more non-volatile storage devices, such as flash memory devices. In some embodiments, the storage medium (e.g., storage medium 130, FIG. 1) is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., storage medium 130, FIG. 1) includes NAND-type flash memory or NOR-type flash memory. In other embodiments, the storage medium comprises one or more other types of non-volatile storage devices.

The storage device (e.g., storage device 120, FIG. 1), in response to receiving the garbage collection read request, performs (908) one or more operations for a garbage collection read, including: identifying (e.g., in accordance with a valid bitmap for the source unit) one or more sequences of valid data in the source unit, wherein each identified sequence of valid data has a length selected from a set of predefined lengths, the set including a first length (e.g., 4K), a second length (e.g., 8K), and a third length (e.g., 16K); for each respective sequence of the one or more sequences of valid data in the source unit, transferring (e.g., reading and buffering) the respective sequence to a respective queue of a plurality of queues, in accordance with the length of the respective sequence (e.g., as described above with respect to FIG. 4A); and setting a global flag to flush all open respective queues (e.g., setting the global flag indicates that the next garbage collection write request should flush all open respective queues, whether the queues are full or not full, as described above with respect to FIGS. 6A-6C).

In some embodiments, the valid bit map is specified by the garbage collection read request, while in some other embodiments, the valid bit map is obtained from a management data structure in accordance with the specified source unit. In some embodiments, a garbage collection (GC) read module (e.g., GC read module 232, FIG. 2) is used to perform one or more operations for a garbage collection read, including: identifying one or more sequences of valid data in the source unit, wherein each identified sequence of valid data has a length selected from a set of predefined lengths, the set including a first length, a second length, and a third length; for each respective sequence of the one or more sequences of valid data in the source unit, transferring the respective sequence to a respective queue of a plurality of queues, in accordance with the length of the respective sequence; and setting a global flag to flush all open respective queues, as described above with respect to FIG. 2.

In some embodiments, each sequence of the one or more sequences of valid data in the source unit includes (916) one or more logical pages of valid data. In some embodiments, a logical page (sometimes referred to as an "L-page") is the minimum granularity unit of data (e.g., 4K) for data read commands or data read operations.

In some embodiments, identifying (e.g., in accordance with the valid bitmap for the source unit) the one or more sequences of valid data in the source unit includes (918): for each respective sequence of valid data, determining whether the respective sequence has the first length (e.g., 4K), the second length (e.g., 8K), or the third length (e.g., 16K) by: determining whether the respective sequence has the third length; in accordance with a determination that the respective sequence does not have the third length, determining whether the respective sequence has the second length; and in accordance with a determination that the respective sequence does not have the second length, determining whether the respective sequence has the first length. See, for example, FIG. 5 for patterns used to detect "runs" of valid data.

In some embodiments, transferring the respective sequence to the respective queue of the plurality of queues, in accordance with the length of the respective sequence, includes (920): in accordance with a determination that the respective sequence of valid data has the first length, transferring (e.g., reading and buffering) the respective sequence of valid data into a first queue of a first type (e.g., a 4K queue extent that can hold four sequences of 4K length each, such as 4K queue 622, FIG. 6A); in accordance with a determination that the respective sequence of valid data has the second length, transferring the respective sequence of valid data into a second queue of a second type (e.g., an 8K queue extent that can hold two sequences of 8K length each, such as 8K queue 624, FIG. 6A); and in accordance with a determination that the respective sequence of valid data has the third length, transferring the respective sequence of valid data into a third queue of a third type (e.g., a 16K queue extent that can hold one sequence of 16K length, such as 16K queue 626, FIG. 6A).

In some embodiments, the first queue, the second queue, and the third queue are (922) the same size (e.g., 4 pages or 16K).

In some embodiments, in the plurality of queues, queues of the first type of queue each hold (924) single logical pages. For example, queues of the first type of queue hold four sequences of 4K length each, each sequence of 4K length sometimes referred to as a "4K run" (e.g., 4K queue 622, FIG. 6A).

In some embodiments, in the plurality of queues, queues of the second type of queue each hold (926) at least one sequence of logical pages of at least the second length. For example, queues of the second type of queue hold two sequences of 8K length each, each sequence of 8K length sometimes referred to as an "8K run" (e.g., 8K queue 624, FIG. 6A).

In some embodiments, in the plurality of queues, queues of the third type of queue each hold (928) at least one sequence of logical pages of at least the third length. For example, queues of the third type of queue hold one sequence of 16K length, a sequence of 16K length sometimes referred to as a "16K run" (e.g., 16K queue 626, FIG. 6A).

In some embodiments, the storage device (e.g., storage device 120, FIG. 1): in accordance with a determination that the first queue of the first type is full, allocates (930) a fourth queue of the first type; in accordance with a determination that the second queue of the second type is full, allocates a fifth queue of the second type; and in accordance with a determination that the third queue of the third type is full, allocates a sixth queue of the third type. For example, in FIG. 6A, 16K queue 630 is allocated when 16K queue 626 is full, 8K queue 628 is allocated when 8K queue 624 is full, and a 4K queue (not shown) is allocated when 4K queue 622 is full. In some embodiments, an allocating module (e.g., allocating module 236, FIG. 2) is used to allocate queues, as described above with respect to FIG. 2.

The storage device (e.g., storage device 120, FIG. 1) receives (910), at the second module (e.g., Flash Manager 127, FIGS. 1 and 2), a garbage collection write request from the first module (e.g., Front End 126, FIGS. 1 and 2). In some embodiments, a receiving module (e.g., receiving module 220, FIG. 2) is used to receive, at the second module, a garbage collection write request from the first module, as described above with respect to FIG. 2.

The storage device (e.g., storage device 120, FIG. 1), in response to receiving the garbage collection write request and in accordance with the global flag (e.g., in accordance with the global flag being set), performs (912) one or more operations for a garbage collection write, including: identifying open respective queues for writing to a destination unit, wherein open respective queues contain one or more sequences of valid data; and writing from the open respective queues to the destination unit (e.g., as described above with respect to FIGS. 6A-6C). In some embodiments, a garbage collection (GC) write module (e.g., GC write module 234, FIG. 2) is used to, in response to receiving the garbage collection write request and in accordance with the global flag, perform one or more operations for a garbage collection write, including: identifying open respective queues for writing to a destination unit, wherein open respective queues contain one or more sequences of valid data; and writing from the open respective queues to the destination unit, as described above with respect to FIG. 2.

In some embodiments, writing from the open respective queues to the destination unit includes (932) writing from the open respective queues in sequence, from oldest open respective queue to newest open respective queue, to the destination unit (e.g., as described above with respect to FIG. 6A, where 4K queue 622 is the oldest open queue). In some embodiments, writing from the open respective queues to the destination unit includes first writing to the destination unit the complete or full queues, from oldest to newest, and then writing to the destination unit any incomplete queues, from oldest to newest.

In some embodiments, at least one of the identified open respective queues is (934) not full (e.g., an open 4K queue extent that holds less than four sequences of 4K length each, such as 4K queue 622 in FIG. 6A, or an open 8K queue extent that holds less than two sequences of 8K length each, such as 8K queue 628 in FIG. 6A).

In some embodiments, writing from the open respective queues to the destination unit includes (936) (e.g., prior to writing data from the open respective queues to the destination unit) combining open respective queues that are not full to minimize unused space in the destination unit. See, for example, FIGS. 6A-6C. It is noted that the combining of open respective queues may change which queues are complete or full queues.

In some embodiments, the plurality of queues comprises (938) buffer memory distinct from non-volatile memory in the destination unit (e.g., distinct from destination block 640, FIG. 6A).

In some embodiments, the storage device, after writing from the open respective queues to the destination unit, marks (914) the block (e.g., the block containing the last valid pages which were in an incomplete queue extent that was written) as eligible for erasing. In some embodiments, a marking module (e.g., marking module 240, FIG. 2) is used to mark the block as eligible for erasing, as described above with respect to FIG. 2.

In some embodiments, any operations of method 900 described above are performed by a storage device, the storage device including (1) non-volatile memory (e.g., comprising one or more non-volatile storage devices, such as flash memory devices), (2) a storage controller for the storage device, the storage controller including a first module and a second module (3) one or more processors, and (4) controller memory (e.g., non-volatile memory or volatile memory in or coupled to the controller) storing one or more programs, which when executed by the one or more processors cause the storage device to perform or control performance of any of the methods described herein.

In some embodiments, any operations of method 900 described above are performed by a storage device including means for performing any of the methods described herein.

In some embodiments, any operations of method 900 described above are performed by a storage system comprising (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods described herein.

Some embodiments include a non-transitory computer readable storage medium, storing one or more programs configured for execution by one or more processors of a storage device, the storage device including non-volatile memory, the one or more programs including instructions for performing any operations of method 900 described above.

Furthermore, in some embodiments, one or more features of method 900 are used in implementations of method 800. Similarly, in some embodiments, one or more features of method 800 are used in implementations of method 900.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The semiconductor memory elements located within and/or over a substrate may be arranged in two or three dimensions, such as a two dimensional memory structure or a three dimensional memory structure.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array; or two or more 2D and/or 3D memory devices, packaged together to form a stacked-chip memory device.

One of skill in the art will recognize that this invention is not limited to the two dimensional and three dimensional structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first storage device could be termed a second storage device, and, similarly, a second storage device could be termed a first storage device, without changing the meaning of the description, so long as all occurrences of the "first storage device" are renamed consistently and all occurrences of the "second storage device"

are renamed consistently. The first storage device and the second storage device are both storage devices, but they are not the same storage device.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for operating a storage device that includes non-volatile memory, the method comprising:
    at a storage controller for the storage device:
        receiving a plurality of garbage collection requests, wherein each garbage collection request specifies a source unit;
        in response to receiving a garbage collection request of the plurality of garbage collection requests, performing the following operations for a garbage collection read, including:
            identifying one or more sequences of valid data in the source unit, wherein each identified sequence of valid data has a length of one of a plurality of predefined lengths, the plurality of predefined lengths including at least a first length, a second length, and a third length, wherein the first length, second length and third length are separate and distinct from each other; and
            for each respective sequence of the one or more sequences of valid data in the source unit, transferring the respective sequence to a respective queue of a plurality of queues, in accordance with the length of the respective sequence; and
        after performing the operations for the garbage collection read, performing the following operations for a garbage collection write, including:
            identifying full respective queues for writing to a destination unit; and
            writing from the full respective queues to the destination unit.

2. The method of claim 1, wherein the plurality of queues comprises buffer memory distinct from non-volatile memory in the destination unit.

3. The method of claim 1, wherein:
    the storage controller for the storage device includes a first module and a second module;
    receiving the plurality of garbage collection requests includes receiving, at the second module, a plurality of garbage collection read requests from the first module; and
    the operations for the garbage collection read are performed in response to receiving a respective garbage collection read request of the plurality of garbage collection read requests.

4. The method of claim 3, including:
    prior to performing the operations for the garbage collection write, receiving, at the second module, a garbage collection write request from the first module; and
    performing the operations for the garbage collection write in response to receiving the garbage collection write request.

5. The method of claim 1, wherein each sequence of the one or more sequences of valid data in the source unit includes one or more logical pages of valid data.

6. The method of claim 1, wherein identifying the one or more sequences of valid data in the source unit includes:
    for each respective sequence of valid data, determining whether the respective sequence has the first length, the second length, or the third length by:
        determining whether the respective sequence has the third length;
        in accordance with a determination that the respective sequence does not have the third length, determining whether the respective sequence has the second length; and
        in accordance with a determination that the respective sequence does not have the second length, determining that the respective sequence has the first length.

7. The method of claim 1, wherein transferring the respective sequence to the respective queue of the plurality of queues, in accordance with the length of the respective sequence, includes:
    in accordance with a determination that the respective sequence of valid data has the first length, transferring the respective sequence of valid data into a first queue of a first type;
    in accordance with a determination that the respective sequence of valid data has the second length, transferring the respective sequence of valid data into a second queue of a second type; and
    in accordance with a determination that the respective sequence of valid data has the third length, transferring the respective sequence of valid data into a third queue of a third type, wherein the first type, the second type and the third type are separate and distinct from each other.

8. The method of claim 7, wherein the first queue, the second queue, and the third queue are the same size.

9. The method of claim 7, wherein, in the plurality of queues, queues of the first type of queue each hold single logical pages.

10. The method of claim 7, wherein, in the plurality of queues, queues of the second type of queue each hold at least one sequence of logical pages of at least the second length.

11. The method of claim 7, wherein, in the plurality of queues, queues of the third type of queue each hold at least one sequence of logical pages of at least the third length.

12. The method of claim 7, including:
in accordance with a determination that the first queue of the first type is full, allocating a fourth queue of the first type;
in accordance with a determination that the second queue of the second type is full, allocating a fifth queue of the second type; and
in accordance with a determination that the third queue of the third type is full, allocating a sixth queue of the third type.

13. The method of claim 1, wherein writing from the full respective queues to the destination unit includes writing from the full respective queues in sequence, from an oldest full respective queue to a newest full respective queue, to the destination unit.

14. The method of claim 1, wherein writing from the full respective queues to the destination unit includes writing from the full respective queues to the destination unit until the destination unit is full.

15. The method of claim 1, including:
prior to performing the operations for the garbage collection write:
in accordance with logical address information, rearranging one or more sequences of valid data in the plurality of queues to group logically sequential data together, wherein at least one queue in the plurality of queues has a longer sequence of logically sequential data after the rearranging than before the rearranging.

16. The method of claim 1, wherein identifying full respective queues and writing from the full respective queues includes:
identifying full respective queues for writing to one or more destination units in one or more memory channels, respectively; and
in accordance with a determination that at least N of the full respective queues are logically sequential, where N is a predefined integer greater than one, writing the N full respective queues that are logically sequential to destination units in at least two different memory channels.

17. The method of claim 16, wherein writing the N full respective queues that are logically sequential to destination units in at least two different memory channels includes:
writing from a first queue of the N full respective queues that are logically sequential to a first destination unit of a first memory channel; and
writing from a second queue of the N full respective queues that are logically sequential to a second destination unit of a second memory channel.

18. The method of claim 1, wherein the storage device comprises one or more flash memory devices.

19. A storage device, comprising:
non-volatile memory;
means for receiving a plurality of garbage collection requests, wherein each garbage collection request specifies a source unit;
means for, in response to receiving a garbage collection request of the plurality of garbage collection requests, performing the following operations for a garbage collection read, using:
means for identifying one or more sequences of valid data in the source unit, wherein each identified sequence of valid data has a length of one of a plurality of predefined lengths, the plurality of predefined lengths including at least a first length, a second length, and a third length, wherein the first length, second length and third length are separate and distinct from each other; and
means for, for each respective sequence of the one or more sequences of valid data in the source unit, transferring the respective sequence to a respective queue of a plurality of queues, in accordance with the length of the respective sequence; and
means for, after performing the operations for the garbage collection read, performing the following operations for a garbage collection write, using:
means for identifying full respective queues for writing to a destination unit; and
means for writing from the full respective queues to the destination unit.

20. A non-transitory computer readable storage medium, storing one or more programs configured for execution by one or more processors of a storage device, the storage device including non-volatile memory, the one or more programs including instructions for performing a set of operations, including:
receiving a plurality of garbage collection requests, wherein each garbage collection request specifies a source unit;
in response to receiving a garbage collection request of the plurality of garbage collection requests, performing the following operations for a garbage collection read, including:
identifying one or more sequences of valid data in the source unit, wherein each identified sequence of valid data has a length of one of a plurality of predefined lengths, the plurality of predefined lengths including at least a first length, a second length, and a third length, wherein the first length, second length and third length are separate and distinct from each other; and
for each respective sequence of the one or more sequences of valid data in the source unit, transferring the respective sequence to a respective queue of a plurality of queues, in accordance with the length of the respective sequence; and
after performing the operations for the garbage collection read, performing the following operations for a garbage collection write, including:
identifying full respective queues for writing to a destination unit; and
writing from the full respective queues to the destination unit.

* * * * *